US007490071B2

(12) United States Patent
Milenova et al.

(10) Patent No.: US 7,490,071 B2
(45) Date of Patent: Feb. 10, 2009

(54) SUPPORT VECTOR MACHINES PROCESSING SYSTEM

(75) Inventors: Boriana L. Milenova, Somerville, MA (US); Joseph S. Yarmus, Groton, MA (US); Marcos M. Campos, Cambridge, MA (US); Mark A. McCracken, Belmont, MA (US)

(73) Assignee: Oracle Corporation, Redwood Shores, CA (US)

( * ) Notice: Subject to any disclaimer, the term of this patent is extended or adjusted under 35 U.S.C. 154(b) by 345 days.

(21) Appl. No.: 10/927,111

(22) Filed: Aug. 27, 2004

(65) Prior Publication Data

US 2005/0049990 A1 Mar. 3, 2005

Related U.S. Application Data

(60) Provisional application No. 60/498,699, filed on Aug. 29, 2003.

(51) Int. Cl.
*G06F 17/00* (2006.01)
*G06N 5/00* (2006.01)

(52) U.S. Cl. ............................... 706/45; 706/46; 706/12

(58) Field of Classification Search .................. 706/45, 706/46, 12
See application file for complete search history.

(56) References Cited

OTHER PUBLICATIONS

Kristin P. Bennett et al., Support Vector Machines: Hype or Hallelujah?, 2000, ACM SIGKDD, 1-13.*

Nello Cristianini, An Introduction to Support vector Machines and other kernel-based learning methods, 2000, Cambridge, Cover and title page.*

Tom Howley et al., The Genetic evolution of Kernels for Support vector Machine Classifiers, 2004, National University of Ireland @ Galway.*

Yiming Yang, A Scalability Analysis of Classifiers in Text Categorization, ACM SIG Alternate.cls, 2003, 96-103.*

Andrea Boni et al., Digital Architectures for Adaptive Processing of Measurement Data, 2004, University of Trento.*

S. Sathiya et al., Building Support Vector Machines with Reduced Classifier Complexity, 2006, Journal of Machine Learning Research, 1493-1515.*

Nello Cristianini et al., An Introduction to Support Vector Machines, Mar. 2000, University of Cambridge, 103-122.*

* cited by examiner

*Primary Examiner*—Joseph P Hirl
(74) *Attorney, Agent, or Firm*—Hanify & King, P.C.

(57) ABSTRACT

An implementation of SVM functionality improves efficiency, time consumption, and data security, reduces the parameter tuning challenges presented to the inexperienced user, and reduces the computational costs of building SVM models. A system for support vector machine processing comprises data stored in the system, a client application programming interface operable to provide an interface to client software, a build unit operable to build a support vector machine model on at least a portion of the data stored in the system, based on a plurality of model-building parameters, a parameter estimation unit operable to estimate values for at least some of the model-building parameters, and an apply unit operable to apply the support vector machine model using the data stored in the system.

18 Claims, 10 Drawing Sheets

SUPPORT VECTOR MACHINES PROCESSING SYSTEM

CROSS-REFERENCE TO RELATED APPLICATIONS

The benefit under 35 U.S.C. § 119(e) of provisional application 60/498,699, filed Aug. 29, 2003, is hereby claimed.

BACKGROUND OF THE INVENTION

1. Field of the Invention

The present invention relates to providing an implementation of Support Vector Machines functionality integrated into a relational database management system 2. Description of the Related Art Support Vector Machines (SVM) is a state-of-the-art data mining algorithm which has been used with great success in challenging domains such as text mining and life sciences. However, there are a number of problems with conventional implementations of SVM. For example, in conventional implementations, users have to export their data outside of the database and then use stand-alone packages to build and score SVM models. This approach is inefficient, time consuming, and compromises data security.

Another problem with conventional implementations is that building SVM models represents a significant challenge to the inexperienced user. Often, in order to produce a reasonable model, extensive parameter tuning is required. The users have to search the parameter space—usually via a grid search—for a combination of values that produces satisfactory accuracy and/or scoring performance. This is a time consuming and laborious process exacerbated by the fact that these parameters interact. In addition, building SVM models requires considerable system resources (memory and CPU). This problem is typically solved by learning on subsets (chunks) of the data. These chunks are updated at every iteration and the model build continues until the convergence conditions on the entire dataset are met. Usually chunks are composed from the examples that violate convergence conditions to the greatest extent. Finding the worst violators is computationally expensive. Additionally, this approach can result in oscillations that slow down the build process significantly.

A need arises for a technique by which SVM may be implemented that improves efficiency, time consumption, and data security, which reduces the parameter tuning challenges presented to the inexperienced user, and which reduces the computational costs of building SVM models.

SUMMARY OF THE INVENTION

The present invention provides an improved SVM processing functionality. This improves efficiency, time consumption, and data security, reduces the parameter tuning challenges presented to the inexperienced user, and reduces the computational costs of building SVM models. Preferably, the SVM functionality is implemented as a table function (trusted C callout) that is directly accessible via SQL statements. This greatly enhances the usability of the SVM functionality, improves efficiency, and reduces data movement and storage requirements. During scoring, the algorithm may employ the framework of the database and thus achieve better performance/scalability by fully utilizing the existing system resources. Alternatively, SVM functionality may be implemented using code implemented in the database kernel.

The SVM implementation of the present invention includes a computationally inexpensive method for automatic parameter estimation to simplify the building of high quality, well-performing SVM models. This allows the user to build an accurate, high performance model without parameter tuning.

The present invention provides a method for partial random chunk selection. When SVM models are trained via chunking, oscillations can sometimes occur when chunks are selected entirely on the convergence condition ranking. Additionally, computing the ranks for the entire dataset, after each iteration, is expensive. In the present invention, the chunks are composed from two different groups of vectors: current violators and members of the previous chunk. This results in a smoother, less oscillating build process. This smoothing strategy results in considerable decrease of oscillations and faster SVM builds.

In one embodiment of the present invention, a system for support vector machine processing comprises data stored in the system a client application programming interface operable to provide an interface to client software, a build unit operable to build a support vector machine model on at least a portion of the data stored in the system, based on a plurality of model-building parameters, a parameter estimation unit operable to estimate values for at least some of the model-building parameters, and an apply unit operable to apply the support vector machine model using the data stored in the system.

In one aspect of the present invention, the parameter estimation unit may be further operable to select a kernel type method. The kernel type method may be selected from a linear kernel function and a non-linear kernel function based on an effective dimensionality of training data.

In one aspect of the present invention, the parameter estimation unit may be further operable to select a complexity parameter C method. The complexity parameter C method may be selected for a classification method. The classification method may be a binary classification method or a multi-class classification method. The parameter estimation unit may be further operable to select the complexity parameter C method for a linear kernel method. The complexity parameter C method may be selected for a linear kernel method by selecting a random sample comprising k pairs of training vectors of opposite class, one member of each pair being of positive class and one member of each pair being of negative class, for each pair, assigning C to have a value such that a margin for the positive class is 1 and a margin for the negative class is −1, ordering the assigned values of C, and selecting as C a k-th highest assigned value of C.

In one aspect of the present invention, the parameter estimation unit may be further operable to select the complexity parameter C method for a Gaussian kernel method. The complexity parameter C method may be selected for a Gaussian kernel method by selecting a random group comprising k examples of positive class and k examples of negative class, predicting a class for each member of the random group, wherein the examples are support vectors with a constant value of alpha, removing examples that predict a wrong class, for each remaining example, estimating C as a value required to separate the example from all other group members with a margin of 1, ordering the estimated values of C, and selecting as C a k-th highest estimated value of C. The parameter estimation unit may be further operable to select the complexity parameter C method for a regression method. The complexity parameter C method may be selected for a regression method by selecting a value of C that is a multiple of a target class standard deviation.

In one aspect of the present invention, the parameter estimation unit may be further operable to select the complexity parameter C method for a one-class support vector machine method. The complexity parameter C method is selected for a one-class support vector machine method by selecting an initial value of C, increasing the value of C, while an outlier rate with the initial value of C is above a user-specified value, setting C to an average of a current value of C and a previous value of C, once the value of C is above the user-specified value, until a target outlier rate is substantially achieved or a maximum number of iterations is reached.

In one aspect of the present invention, the parameter estimation unit may be further operable to select a standard deviation σ for a Gaussian kernel method. The parameter estimation unit may be further operable to select a standard deviation σ for a Gaussian kernel method for a classification method. The standard deviation a for a Gaussian kernel method for a classification method may be selected by selecting k pairs of training vectors of opposite class, one member of each pair being of positive class and one member of each pair being of negative class, for each pair, computing an estimate of σ based on a distance between members of the pair, and selecting as σ a k-th highest estimated σ. The parameter estimation unit may be further operable to select a standard deviation σ for a Gaussian kernel method for a regression method. The standard deviation σ for a Gaussian kernel method for a regression method may be selected by selecting pairs of random points from the data, for each pair, determining distances between members of the pair, ranking the determined distances, and selecting as σ a k-th highest distance percentile of the ranked distances.

In one aspect of the present invention, the parameter estimation unit may be further operable to select a standard deviation σ for a Gaussian kernel method for a one-class support vector machine method. The standard deviation σ for a Gaussian kernel method for a one-class support vector machine method may be selected by selecting pairs of random points from the data, both members of each pair being of the one class, for each pair, determining distances between members of the pair, ranking the determined distances, and selecting as σ a k-th highest distance percentile of the ranked distances.

In one aspect of the present invention, the parameter estimation unit may be further operable to select an $\epsilon$ parameter for a regression method. The $\epsilon$ parameter for a regression method is selected by selecting an initial value of $\epsilon$, selecting a random sample of data, converging on the random sample of data, estimating prediction noise using a held-aside data set, repeatedly adjusting $\epsilon$ to be a function of the residuals computed on held-aside data, selecting as $\epsilon$ an adjusted value of $\epsilon$ that produces a lowest residual on the held-aside data set.

In some problem domains, the data available for model building may consist of members of a single class. Examples include outlier detection, in which the goal is to identify "typical" members of a multi-dimensional distribution; fraud detection, where only instances of the non-fraud are available or where only non-fraud cases are assumed to be similar to each other; diagnosis assistance, for which only instances of the disease are available and assumed to have similar character. For such domains, the support vector machine model may be a "one-class classifier" support vector machine algorithm.

In one aspect of the present invention, the build unit may be further operable to build a support vector machine model on at least a portion of the data stored in the database management system using stratified random sampling.

In one aspect of the present invention, the processing unit may further comprise an incremental update unit. The incremental update unit may be operable to incorporate additional data into an existing model without rebuilding the entire model. The incremental update unit may be operable to adapt an existing model to a stream of data wherein an underlying distribution changes over time. The incremental update unit may be operable to perform incremental learning.

In one aspect of the present invention, the build unit may comprise a table function. The apply unit may comprise a table function.

In one aspect of the present invention, the build unit may be operable to use a pivot method to filter transactional data and to use a reverse pivot method to process non-transactional data. The apply unit may be operable to use a pivot method to filter and split transactional data and to use a reverse pivot method to process non-transactional data. The build unit may comprise a table function. The apply unit may comprise a table function.

In one aspect of the present invention, the build unit may be operable to use a pivot method to filter transactional data and to use a reverse pivot method to process non-transactional data. The apply unit may be operable to use a pivot method to filter and split transactional data and to use a reverse pivot method to process non-transactional data.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
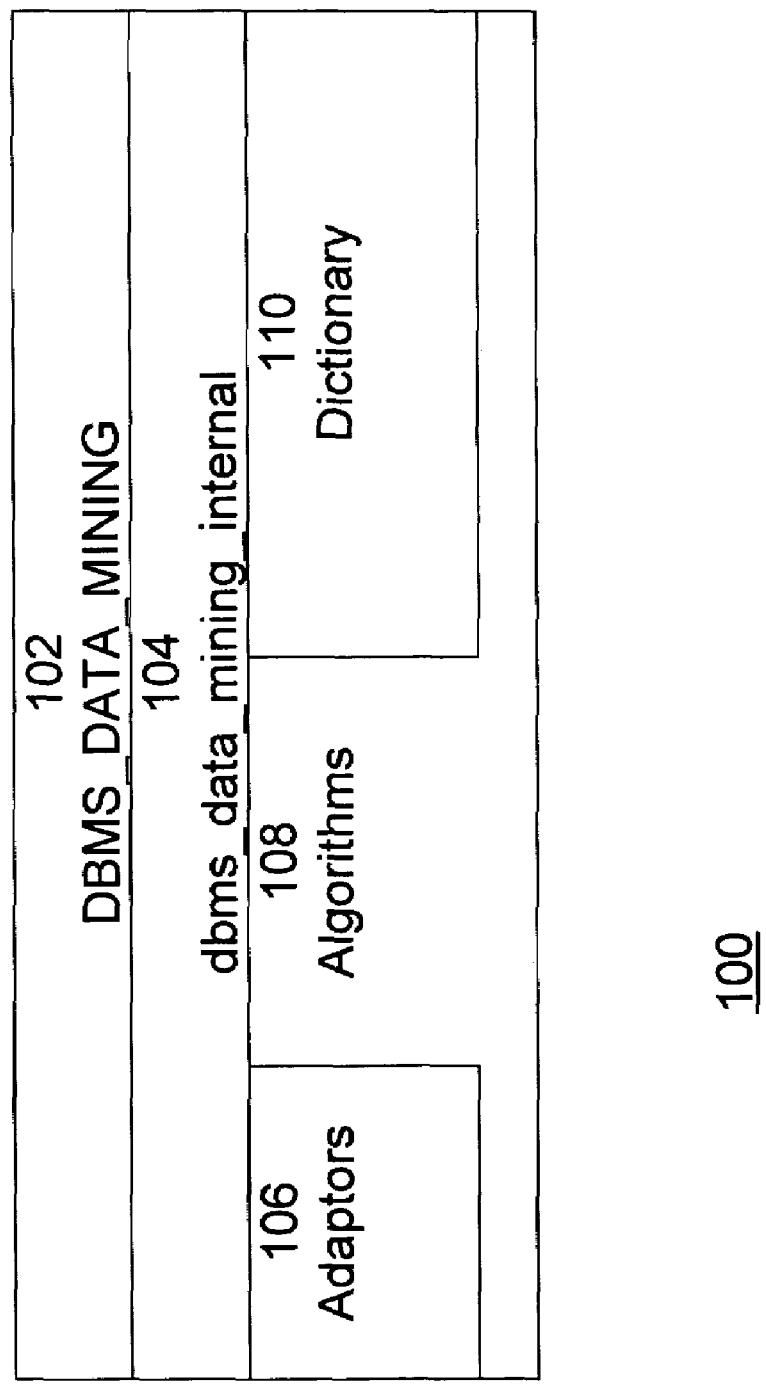
FIG. 1 is an exemplary software block diagram of a database management system 100 incorporating the present invention.

The present invention provides an implementation of SVM functionality integrated into a relational database management system (RDBMS). This improves efficiency, time consumption, and data security, reduces the parameter tuning challenges presented to the inexperienced user, and reduces the computational costs of building SVM models. The implementation of the present invention integrates SVM functionality with data mining functionality in an RDBMS. Preferably, the SVM functionality is implemented as a table function (trusted C callout) that is directly accessible via SQL. This table function is an internal API that can be directly invoked by internal users (e.g., currently used by text processing functions). The external API wraps the table function call in a PL/SQL procedure (or Java). The table function implementation facilitates integration with the core database functionality. The data source is a cursor and the original data can undergo a variety of transformations without materialization before being supplied to the SVM algorithm. This greatly enhances the usability of the algorithm, improves efficiency, and reduces data movement and storage requirements. During scoring, the algorithm can employ the parallel framework of the database and thus achieve better performance/scalability by fully utilizing the existing system resources.

The SVM implementation of the present invention includes a computationally inexpensive method for automatic parameter estimation to simplify the building of high quality, well-performing SVM models. The methodology used has a number of factors.

Tuning the complexity parameter C allows the user to trade off between accuracy on the training data and model complexity. For the linear kernel case, a small random sample of pairs of training vectors of opposite class is used and C is forced to be such that the margins are +/−1 for the positive and negative classes, respectively. The obtained values of C are then ordered and the k-th highest C is chosen. For the Gaussian case, to avoid using noisy examples (e.g., a positive case surrounded by negative cases): 1) a random group consisting of k positive and k negative examples is used to compute all pairwise kernels; 2) assuming the examples are support vectors with a constant value of alpha, the class for each group member is predicted; 3) examples which predict the wrong class are removed 4) With respect to each remaining example, C is estimated as the value required to separate the point from all other group members with a margin of 1; 5) As above, the obtained values of C are then ordered and the k-th highest C is chosen. For regression, a C is chosen that is a multiple of the target class variance.

Tuning the standard deviation parameter (sigma) for Gaussian kernels allows the user to control the neighborhood of influence of the support vectors. As with the complexity parameter, the standard deviation affects the trade off between accuracy on the training data and model complexity. For classification, pairs are chosen of opposite class. Sigma estimates are computed as the distance between the points within a pair. Sigma is chosen as the k-th highest sigma estimate. The estimated value of sigma is subsequently used in the estimation of C for Gaussian kernels. For regression, the standard deviation parameter (sigma) for Gaussian kernels is estimated on the basis of computed distances amongst examples in the input space. These distances reflect the effective dimensionality of the problem. Pairs of random points are drawn from the data and their distances are ranked. Sigma estimate is then chosen as the k-th highest distance percentile.

Tuning the $\epsilon$ parameter in SVM regression allows the user to control the width of the insensitive region around the prediction. The model considers predictions that are within $\epsilon$ of the actual target value to be correct. This approach starts with a small value of $\epsilon$ and converges on a small random sample. Then, the prediction noise is estimated from the initial model on a small held-aside data set, the value of $\epsilon$ is adjusted to the average of the previous $\epsilon$ value and the square root of the mean square residual divided by a fraction of the number of dimensions, and the build is continued. This adaptive step is repeated k times during the initial build process. The value of $\epsilon$ that produces the lowest residuals on the held-aside data will be used for the final build. After the value of $\epsilon$ has been finalized, the model is rebuilt using the full data.

In one-class SVM models, the standard deviation parameter (sigma) for Gaussian kernels is estimated on the basis of computed distances amongst examples from a the single class. These distances reflect the effective dimensionality of the problem. Pairs of random points are drawn from the data and their distances are ranked. Sigma estimate is then chosen as the k-th highest distance percentile.

In one-class SVM models, the complexity factor (C) trades of the rate of incorrect positive predictions (false alarms) and incorrect negative predictions (false negatives). Increasing C lowers the false negative rate and increases the false alarm rate. Given that all training examples are from a single class, only the rate of false negative rate (outlier rate) can be directly optimized during the build. Lowering the outlier rate significantly on the training data may result in a high false alarm rate on unseen data. The C estimation approach relies on achieving a user-specified outlier rate (within reasonable precision) on the training data. This rate is expected to generalize to new data with the same distribution as the training data. The estimation process starts with a small value of C. If the outlier rate with this initial C estimate is too high, the value of C is increased. As long as the current outlier rate is above the user-specified one, the value of C is doubled. If the model overshoots the desired outlier rate, the C update method switches to a Cauchy search where the next C value is the average of the current and the previous ones. The grid search continues until either the desired rate is achieved within reasonable precision or a maximum number of iterations are reached.

In addition, the present invention provides a method for efficient decomposition. When SVM models are trained via chunking, oscillations can sometimes occur when chunks are selected entirely on the convergence condition ranking. Additionally, computing the ranks for the entire dataset, after each iteration, is expensive. In this approach, the chunk is composed from two different groups of vectors: current violators and members of the previous chunk. This results in a smoother, less oscillating build process. There are two stages in the violator selection process. First, the mean violation across all violators is computed, the violators are scanned starting at a random point in the violator list, and only the ones above the mean are chosen. Second, if not enough examples were selected during this first pass, additional violators are randomly selected to fill up the chunk. From the members of the previous chunk, the non-bounded support vectors (up to 50% of the chunk capacity) are retained and if there are not enough non-bounded support vectors, other members of the previous chunk are added to achieve smoothing. This smoothing strategy results in considerable decrease of oscillations and faster SVM builds.

The present invention uses stratified sampling methods with respect to the target distribution. SVM model build times scale quadratically to cubically with the number of training data records. To achieve reasonable build durations, often only a sample of the available data is used. Random sampling has been shown to produce inadequate models in cases where the target distribution is skewed. In classification, often some target classes dominate while some other classes are under-represented. In the case of regression, the continuous target may be concentrated in certain ranges while the coverage in other areas is poor. A small random sample will fail to provide the SVM algorithm with adequate information about the classes/ranges that are under-represented.

We introduce a stratified sampling approach that aims at creating a balanced sample with respect to the target distribution. This usefulness of this approach is not restricted to SVM but extends also to any type of data mining algorithm that requires data sampling. For SVM classification, the balancing can be accomplished in two stages: 1) initial data read and 2) pool creation. During the initial data read the goal is to create a stratified sample using a single scan of the dataset. The task is non-trivial since the nature of the data is completely unknown—there is no information available in advance regarding the total number of records, target cardinality, and target distribution. For the sake of efficiency and to reduce complexity, several simplifying assumptions need to be made: 1) the data cursor is randomized with respect to sequence id order of presentation; 2) regardless of the nature of the data mining classification problem, an individual target value can be adequately represented by a pre-defined number of examples (e.g., 50 K); and 3) given a stratified sample across target values, a multi-class classification problem can be adequately modeled by a predefined number of records (e.g., 500 K) across all target values. The last assumption implies that for problems of high cardinality fewer than the pre-specified number of records per target class (e.g., 50 K) may be used.

During the data read, an example is retained if it belongs to a target that has not met its quota. If the quota for a given target has been reached, the new example is ignored. The quota for individual targets may be adjusted once the upper bound on the total number of examples (e.g., 500 K) is reached. Retaining a new record would require replacing an existing row. Such a situation arises, for example, when the new record belongs to a class that has fewer cases than its allowed quota and is under-represented compared to other target classes. A record must be also retained when a new target value is encountered. The new record replaces the last record in the currently most popular class. If several target values are tied on the maximum count, one of these targets is randomly selected. The quotas per target are subsequently adjusted to the number of examples in the most popular class—1.

The second stage of balancing occurs during pool selection for multi-class classification. Multi-class classification is modeled as a collection of binary models. The individual binary models learn to distinguish a given target class from the rest of the data. For active learning, we make use of a pool (subsample of the loaded data). In order to build a good-quality binary model, it is desirable to create a pool stratified with respect to the other target classes. We employ a sampling strategy where target quotas are adjusted dynamically. Ideally, the pool will contain 50% positive cases, 50% negative cases, and the negative cases will be balanced across target values. If this perfect balancing is not possible, the quotas are adjusted such that the pool is always filled to capacity. As a first step the relative percentages of positive vs. negative examples are determined. The second step requires computing the quotas of the negative classes. If some of the negative classes are under-represented, the quotas for the other ones are increased.

Target stratification for regression requires building a target histogram. This is feasible only at the pool creation stage. The initial data read loads a large random sample of the data (e.g., 500 K). During pool selection, the target histogram counts govern the quotas for specific target ranges. Ideally, each bin (target range) should be equally represented, however, in order to fill the pool to capacity, the large bins may have higher representation. The individual bin counts are ordered in ascending order then the corresponding quotas are computed adaptively by redistributing the unused data slots among the bins with higher counts.

The technique of the present invention provides a number of significant benefits. For example, implementing SVM as a table function and fully integrating it within the database infrastructure has tremendous benefits over using a standalone tool. The benefits are: no data movement, use of pipelining (no materialization), use of SQL-based transformations in the query, and increased security. The parameter tuning approach of the present invention significantly increases usability, speeds up model build, and produces results comparable to the best grid search approaches that are the current standard in the field. The chunking methodology of the present invention has considerable computational efficiency advantages over the standard chunking methods in the field.

The primary concepts behind the SVM approach and strategies for solving the SVM optimization problem are described below.

Logical rows associated with analysis entities are viewed as patterns in SVM terminology. Each pattern is a vector of predictor values and a target value. SVM uses patterns to predict target values. In SVM binary classification, for example, where the target takes on two values, SVM seeks a boundary separating the two classes. The boundary is a function of the predictor values associated with one or more patterns. The insight is that the points or patterns lying closest to the boundary define the boundary. The other data points are not relevant. The relevant points are called support vectors. The goal of the SVM optimization is to identify the support vectors and assign to them weights that would produce an optimal solution.

Support vector machines belong to a class of algorithms known as kernel methods. Kernel methods rely on applying kernel functions to the input data.

The following kernel functions have been used in SVM applications:

$$\text{Linear: } K(x_i, x_j) = \langle x_i \cdot x_j \rangle = \sum_k x_{ik} x_{jk}$$

Polynomial: $K(x_i,x_j)=(ax_ix_j+c)^d$, for a dth order polynomial

Gaussian: $K(x_i,x_j)=\exp(-\|x_i-x_j\|^2/2\sigma)$

Sigmoid: $K(x_i,x_j)=\tan h(ax_ix_j+c)$

The linear kernel is appropriate for data sets that can be treated accurately as a linear model. In general, data sets with a large number of columns and few rows can be modeled with linear kernels. In low-dimensional datasets, non-linear kernel functions are used to transform the input data into a high dimensional feature space. This high dimensional feature space gives the model flexibility to fit complex non-linear surfaces accurately. High-dimensional feature spaces are sufficient to provide good fits to most training data. In the transformed high-dimensional feature space, the boundary is a hyperplane. In the original input space, the boundary is a complex non-linear partitioning of the multidimensional input space.

SVM kernel functions must conform to Mercer conditions and are called Mercer kernels. Mercer kernels map to inner product feature spaces. They have the following convenient properties:

The inner product in feature space can be computed directly from the inputs.

The optimization problem is convex, implying that it has a unique optimum solution. In contrast with Neural Networks, SVM does not get caught in local minima.

Note that some of the Kernels have user parameter settings:
standard deviation (Gaussian kernel)
coefficient and bias terms (sigmoid and polynomial kernels)
polynomial degree (polynomial kernels)

SVM attempts to find the optimal hyperplane that would provide good generalization when presented with novel data. In the linearly separable case, the optimal hyperplane would be the one with largest "margin", that is, the one that will provide the widest and most robust separation between targets. In the linearly inseparable case, SVM balances the flexibility to fit complex non-linear surfaces (capacity of the model) with margin maximization. The margin size counterbalances the richness of the hypotheses sets and prevents over-fit. Increasing the margin, creates a series of hypothesis sets with monotonically decreasing complexity (richness). SVM bounds the generalization error by trading off the training set error for hypothesis set complexity.

There are two types of SVM optimization:
hard margin optimization—applicable to cases where the target classes are linearly separable. The margin maximization ensures that among all possible separating hyperplanes, the one that provides optimal class separation would be chosen.
soft margin optimization—applicable to cases where target classes cannot be linearly separated without overfitting the data. A misclassification penalty is applied to balance margin size and model accuracy on the training data.

The choice of norm of the misclassification penalty term leads to different types of soft margin. The L1 and L2 norms result in 1-Norm soft margin and 2-Norm soft margin optimization, respectively. The approach that performs better in practice will depend on at least a portion of the data and may be influenced by the type of noise.

The user may specify misclassification costs to alter the optimization performed by the SVM classification build operation. In the primal formulation of SVM, the cost, C, is a weighting factor on the errors made by the model. Differentially weighting the two classes will cause the model to allow more errors, when predicting the class with the higher value of C. Specifying a higher cost for a given class will cause the model to predict that class more often, both correctly and incorrectly. From the user viewpoint it may be that not all misclassifications are equal. In a medical problem, predicting no reaction, when death occurs is a much more serious error, than predicting a mild reaction when no reaction occurs. Or, in a marketing application that is intended to promote sale of a product, given the cost of the promotion and the potential revenue from a sale, it may be 10 times worse to misclassify a potential positive respondent than to misclassify a non-respondent.

SVM can encode the different costs associated with different target classes by using a different scale for the misclassification penalty term in the soft margin optimization.

Class priors are appropriate to classification targets only. Class priors are the prior probabilities assigned to each target class. They act as a weight assigned to each entity based on the value of the target. Methods for incorporating priors use different scales for the misclassification penalty term in the soft margin optimization as described above in the section on misclassification costs. When the data is highly unbalanced SVM often cannot find a good separating plane in the feature space. This is due to the focus of the optimization on the dominant class. Priors can often be used to overcome this deficiency by assigning higher weight to the rare class.

Support Vector Machines evolve a very simple classification concept into a powerful state-of-the-art classifier. Imagine separating two target classes via a predictor hyper-plane. For example, with two predictors, the hyper-plane is just a line. Instances of class 1 are on one side of the line. Instances of class 2 are on the other side. However, straight lines and hyper-planes are rather rigid structures and may often be poor classifiers. To increase the richness of the candidate classifiers, a non-linear transformation is applied to the predictor inputs. In the transformed predictor space, the classifier still appears as a simple hyper-plane or line. In the original input space, similar to Neural Networks, non-linear functions of original inputs span the multidimensional predictor surface.

One SVM optimization problem relates to the hard margin. The simplest SVM model is the so-called maximum/hard margin classifier. It can be applied to linearly separable data. The goal is to find the largest margin hyperplane that classifies all data points correctly. That is, find $$\min_{w,b} \langle w,w \rangle, \text{ subject to } y_i(\langle w \cdot x_i \rangle + b) \geq 1,$$

where w is the weight vector, $x_i$ is an input vector, $y_i$ is the corresponding target, and b is the bias term.

It can be shown that the maximal margin hyperplane has a margin $1/\|w\|^2$. That is, by minimizing the weights, one maximizes the margin. The SVM optimization problem is a convex quadratic function with linear constraints. Problems of this type are traditionally solved using a Lagrangian function. The primal Lagrangian for the hard margin SVM is given by:

$$L(w, b, \alpha) = 1/2 \langle w \cdot w \rangle - \sum_i \alpha_i [y_i(\langle w \cdot x_i \rangle + b) - 1],$$

where $\alpha_i$ are Lagrange multipliers and $\alpha_i \geq 0$.

Differentiating with respect to the primal variables w and b and subsequent substitution in the primal Lagrangian, produces the dual Lagrangian function that can be optimized more efficiently:

$$W(\alpha) = \sum_i \alpha_i - 1/2 \sum_{i,j} y_i y_j \alpha_i \alpha_j \langle x_i \cdot x_j \rangle,$$

subject to $$\sum_i y_i \alpha_i = 0$$

and $\alpha_i \geq 0$.

The dual representation also illustrates the use of kernel functions. Instead of a linear kernel, a kernel of any complexity and curvature can be plugged in $W(\alpha)$. The goal of SVM optimization is to find the values of the Lagrange multipliers maximizing $W(\alpha)$. Data points with non-zero ai become the support vectors of the model.

An alternative SVM optimization problem relates to the soft margin. In this situation, in order to allow for errors in the training data, it is necessary to introduce slack variables in the margin constraints, that is, find $$\min_{\xi,w,b} \langle w \cdot w \rangle + C \sum_i \|\xi_i\|,$$

subject to $$y_i(\langle w \cdot x_i \rangle + b) \geq 1 - \xi_i$$

$$\xi_i \geq 0,$$

where $\xi_i$ are the slack variables. Note that when $\xi_i$ is greater than 0, the model makes an error predicting the $i^{th}$ support vector. Thus, the slack variable formulation extends the hard margin case to allow for "noise" (errors in prediction). Not all points may be correctly classified.

The parameter C controls the trade-off between margin (model complexity) and accuracy on the training data. In practice, C needs to be varied through a wide range of values and the generalization performance needs to be assessed on a separate validation set using cross-validation. An alternative method is where C and kernel parameter are optimized via gradient descent on the estimate of the generalization error bound. Note that the norm of the slack variable term can be either L1 or L2. Using L1 leads to 1-Norm soft margin optimization (Box Constraints) with the following dual Lagrangian problem:

$$\max W(\alpha) = \sum_i \alpha_i - 1/2 \sum_{i,j} y_i y_j \alpha_i \alpha_j K(x_i, x_j),$$

subject to $$\sum_i y_i \alpha_i = 0$$

and $C \geq \alpha_i \geq 0$.

The 1-Norm soft margin is reduced to the hard margin case by setting C to infinity. Using L2 norm in the slack variable term leads to 2-Norm soft margin optimization (Weighting the Diagonal) with the following dual Lagrangian problem:

$$\max W(\alpha) = \sum_i \alpha_i - 1/2 \sum_{i,j} y_i y_j \alpha_i \alpha_j (K(x_i, x_j) + \delta_{ij} 1/C),$$

subject to $$\sum_i y_i \alpha_i = 0$$

and $\alpha_i \geq 0$, where $\delta_{ij}$ is the Kronecker $\delta$ defined to be 1 when i=j and 0 otherwise.

In 2-Norm soft margin, the Lagrange multipliers are not bounded from above.

The SVM formulation discussed so far addresses a binary target classification problem. In classification problems with multiple classes, there are two common approaches:

Build one-vs.-all SVMs for each target class, that is, build a separate SVM predicting each class against all other classes;

Build one-vs.-one SVMs across target classes, that is, build an SVM for each target combination.

The second approach is considered more accurate, however, it involves building more SVM models. On the other hand, each model is build on a small amount of data and build times are short. If there is a limited amount of data and a large number of classes, one-vs.-all is the only possible strategy.

SVM predictions in such composite models require ranking of the individual model predictions in the one-vs.-all case. Usually, such rankings are based on the prediction margin or some margin-derived probability. In the one-vs.-one case, the target class that wins most of the pair comparisons is used as a prediction.

When the target has a continuous range, the SVM model learns a non-linear regression function in a kernel-induced linear feature space. As in the classification case, the learning algorithm minimizes a convex functional and its solution is sparse.

SVM regression uses a $\epsilon$-insensitive loss function, that is, the loss function ignores values that are within a certain distance from the true value. SVM regression attempts to find a function that has at most $\epsilon$ deviation from the actual target values. This becomes analogous to the classification case, because the algorithm seeks a maximal margin from the line separating over-estimates and under-estimates to the boundaries of the $\epsilon$-tube wherein the "correctly" predicted training data lies. This is achieved via minimization of the weight vector w. Formally, the problem can be stated as:

$$\min 1/2\|w\|^2, \text{ subject to } y_i - \langle w \cdot x_i \rangle - b \leq \epsilon \text{ and}$$
$$\langle w \cdot x_i \rangle + b - y_i \leq \epsilon.$$

If no feasible solution exists, it becomes necessary to introduce a soft margin function for the regression case that uses slack variables to satisfy the otherwise infeasible constraints of the optimization problem. Analogously to the classification case, 1-Norm and 2-Norm soft margins can be considered. The primal optimization problem for 1-Norm soft margin can be stated as:

$$\min 1/2\|w\|^2 + C \sum_i (\xi_i + \xi_i^*),$$

subject to $y_i - \langle w \cdot x_i \rangle - b \leq \epsilon + \xi_i^*$, $\langle w \cdot x_i \rangle + b - y_i \leq \epsilon + \xi_i$, and
$\xi_i, \xi_i^* \geq 0.$ There are two slack variables, one for exceeding the target value by more than $\epsilon$, the other for being more than $\epsilon$ below target. Only one of these slack variables can be non-zero at a time. The 2-Norm soft margin requires squaring the slack variables in the cost function and is subject to the same constraints.

The above formulation can be extended to the non-linear kernel case. It can be shown that the dual Langrangian problem for SVM regression can be stated as:

1-Norm Soft Margin—

$$\max W(\alpha) = \sum_i y_i \alpha_i - \varepsilon \sum_i |\alpha_i| - 1/2 \sum_{i,j} \alpha_i \alpha_j K(x_i, x_j),$$

subject to $$\sum_i \alpha_i = 0$$

and $-C \leq \alpha_i \leq C$.

The points that do not fall strictly inside the E-insensitive tube are the support vectors. Points not touching the tube are bounded support vectors and their Lagrangian multipliers will have the absolute value of C.

2-Norm Soft Margin—

$$\max W(\alpha) = \sum_i y_i \alpha_i - \varepsilon \sum_i |\alpha_i| - 1/2 \sum_{i,j} \alpha_i \alpha_j (K(x_i, x_j) + \delta_{ij} 1/C),$$

subject to $$\sum_i \alpha_i = 0.$$

In 2-Norm soft margin optimization, the Lagrange multipliers are not subject to the Box constraints. Points that do not fall inside the E-insensitive tube are support vectors.

Typically SVM requires the solution of a quadratic programming (QP) problem. The size of the optimization problem depends on the number of training examples. General purpose QP algorithms, such as quasi-Newton and interior point methods, require computation of the covariance matrix $(Q_{ij} = y_i y_j K(x_i, x_j))$.

This computation is quadratic in the number of training examples. For larger learning tasks, it becomes impossible to store the covariance matrix in memory. The literature indicates that SVM is practical in the range of up to several thousands of rows. Techniques for dealing with large data include optimizing the objective functional with respect to subsets of the data—"chunking" and "decomposition". This, however, is currently an area of active research and there are many alternatives, for example, incremental learning methods.

The so-called "chunking" approaches start by optimizing the dual QP problem on an initial arbitrary set of data. The algorithm then retains the support vectors found in the chunk of data and uses the hypothesis to test the remainder of the data and find the points that most seriously violate the optimality conditions (KKT conditions). The worst violators are added to the support vectors and this new chunk of data is re-optimized. This procedure is iterated, initializing a for each new sub-problem with the values output from the previous stage, finally halting when the stopping optimality criteria are satisfied.

A potential problem with chunking is that the optimization problem can become too large with the growing number of support vectors.

The decomposition methods also work on a subset of the data set. However, unlike chunking where the subset size grows, decomposition uses a fixed-size subset. A decomposition method updates only a fixed subset of Langrangian multipliers, while the others are kept constant. To add new points to the working subset, the same number of points in the working subset needs to be removed. The major advantage of decomposition is that the QP problem is fixed in size. The nature of the QP optimization make the solution of many small problems more efficient than the solution of one massive problem.

Sequential Minimal Optimization (SMO) can be viewed as the limiting case of decomposition where the working set is reduced to two, that is, only two Lagrange multipliers are optimized at a time. In this case it is possible to derive an analytical solution. This eliminates the need for a QP solver for the sub-problem.

SMO uses a set of heuristics to identify a pair of parameters to optimize. Once the two points are chosen, the analytic optimization follows the procedure described in the next function.

A Two Point Analytic Solution to SMO included the following:

Calculate box constraints:

$$U \leq \alpha_2^{new} \leq V,$$

where if $y_1 \neq y_2$ then $U = \max(0, \alpha_2^{old} - \alpha_1^{old})$ and $V = \min(C, C - \alpha_1^{old}$, else if $y_1 = y_2$ then $U = \max(0, \alpha_1^{old} + \alpha_{21}^{old} - C)$ and $V = \min(C, \alpha_1^{old} + \alpha_2^{old})$.

Calculate the second derivative of the objective function with respect to the parameters optimized:

$$\kappa = K(x_1, x_1) + K(x_2, x_2) - 2K(x_1, x_2)$$

Calculate the prediction errors for the two points optimized:

$$E_i = \left( \sum_j \alpha_j y_j K(x_j, x_i) + b \right) - y_i$$

Update Lagrange multipliers:

$$\alpha_2^{new} = \alpha_2^{old} + y_2(E_1 - E_2)/\kappa$$

Clip it to enforce box constraints:

if $\alpha_2^{new} < U$ then $\alpha_2^{new} = U$ else if $\alpha_2^{new} > V$ then $\alpha_2^{new} = V$ $$\alpha_1^{new} = \alpha_1^{old} + y_1 y_2 (\alpha_2^{old} - \alpha_1^{new})$$

If κ, is equal to 0, then the objective function needs to be evaluated at both ends of the interval (U and V) and the point that optimizes the objective function is chosen.

The optimization described above is a solution to the 1-Norm soft margin case. However, by setting C to infinity, the solution is applicable to the hard margin case as well. 2-Norm soft margin can be solved as a hard margin case when the capacity parameter C is treated as kernel parameter.

The two-point analytical optimization was originally derived for SVM classification but this algorithm is easily adapted to regression cases.

The choice of the pair of examples for optimization is an important consideration. Traditional SMO uses a set of heuristics to identify two candidates whose optimization would produce progress in the overall objective function. An alternative to this approach is where the strategy is to find a pair of examples that will provide the steepest feasible direction of descent. The method relies on a first-order approximation of the target function.

A variety of optimization stopping criteria have been considered:

Monitoring the growth of the dual objective function—training can be stopped when the increase in the objective function falls under certain threshold. This criterion has been shown to be unreliable and can deliver poor results.

Monitoring the Karush-Kuhn-Tucker (KKT) conditions for the primal problem—training can be stopped when these criteria are satisfied within certain predefined tolerance. Classification 1-Norm soft margin KKT conditions:

if $\alpha_i=0$ then $y_i f(x_i) \geq 1$, where $f(x_i)$ is the prediction of the model;

if $0<\alpha_i<C$ then $y_i f(x_i)=1$; and if $\alpha_i=C$ then $y_i f(x_i) \leq 1$.

Regression 1-Norm soft margin KKT conditions:

if $\alpha_i=0$ then $|f(x_i)-y_i|<\epsilon$, if $0<\alpha_i<C$ then $|f(x_i)-y_i|=\epsilon$; and if $\alpha_i=C$ then $|f(x_i)-y_i|>\epsilon$ The 2-Norm soft margins can be derived analogously.

Monitoring the feasibility gap—training can be stopped when the gap between the primal and dual objective functions vanishes.

SVM classification scores records using the following function:

$$f(x_i) = \sum_j y_j \alpha_j K(x_i, x_j) + b,$$

where j is indexing the support vectors of the model.

In the case of binary classification, $y_i=\text{sgn}(f(x_i))$, where sgn stands for the sign function. That is, $y_i \in [-1,1]$.

For regression, the scoring function is:

$$f(x_i) = \sum_j \alpha_j K(x_i, x_j) + b.$$

The scalability of the "apply" operation is governed by the model complexity. SVM complexity is related to the number of support vectors. The number of support vectors may scale linearly with the number of rows, which implies a practical limit on the training set size. One method, Relevance Vector Machine (RVM), uses a Gaussian prior on the Kernel weights that results in a sparser model and therefore faster scoring. The number of support vectors in RVM is not dependent on the number of training rows. However, RVM has poor scalability.

It is often desirable to be able to estimate the confidence associated with model's prediction. Such estimates allow users to rank the predictions, select decision thresholds, compute lift, etc. Standard SVM were designed as classifiers producing hard class assignments. However, there have been efforts to post-process SVM outputs and recalibrate them into probabilities. SVM's predictions can be ranked on the basis of the margin to the decision surface. That is, the larger the margin, the more confident the prediction. Different recalibration procedures can be considered to translate the margin into probability (e.g., estimating an empirical pdf, fitting a sigmoid, Parzen windows). Using the training set for recalibration can be potentially dangerous because the resulting estimate would be biased. Alternative approaches for computing prediction rank/probability include using a validation data set, performing cross-validation, perturbing the training data with Gaussian noise.

Additional enhancements may be made that further improve the flexibility and performance of the SVM implementation of the present invention. For example, model size for non-linear models may be reduced and build scalability may be improved. In addition, usability may be increased by introducing model maintenance features. The model maintenance features include incremental learning, adding of targets, and deleting of targets from an existing multi-target model. These features are useful, for example, for text processing.

The additional enhancements may include:

reduced model size to improve apply performance for non-linear models (memory and speed);

model maintenance capabilities;

one-class capability—allow a model to be trained on examples from a given class without providing counter examples;

speeded up model build to allow handling of large datasets;

additional kernel functions error bars for regression improved probability estimates for classification improved SVM automated parameter estimation and extend it to automatic kernel selection.

One of the major problems with the classical SVM approach is that the number of support vectors increases linearly with the size of the training data. This is a very serious problem for models with non-linear kernels where the size of the model depends on the number of support vectors. Increased model size makes building non-linear SVM models impractical. Scoring performance becomes very slow and there are high disk and memory requirements. Models with linear kernels are not as severely affected, since they can be stored as an array of linear coefficients instead of storing the original support vectors. However, some types of incremental training require storing the actual support vectors instead of, or in addition to, the linear coefficients. In such cases, model size for linear kernel SVM would be also dependent on the training data size.

The SVM techniques of the present invention produce small non-linear SVM models by default. This requirement is essential to make non-linear SVM online scoring feasible. Model scoring is expected to improve by several orders of magnitude. Non-linear SVM models should be sufficiently small (~1 Mb) to be loaded in shared memory, therefore allowing fast apply operation and efficient multi-user support.

The model size reduction will be accomplished via an active learning mechanism that will produce an approximate solution to the SVM optimization problem. Active learning forces the SVM algorithm to restrict learning to the most informative training examples and thus not attempt to converge on the entire body of data.

Sufficient model size reduction would make SVM models a feasible choice for applications that require not only high accuracy but also fast, possibly online, scoring. There are several approaches for model size reduction that may provide improvement.

One approach is the reduced set methods. The idea behind reduced set SVM is to represent the support vectors of an already trained SVM model by a smaller set of support vectors. The reduced set consists of either some of the original support vectors or of newly estimated support vector points that would provide a good approximation to the model. The problem can be formalized as follows:

An SVM model is defined by a set of support vectors and corresponding coefficients. Scoring such a model requires computing the expansion:

$$y_j = \sum_{i=1}^{N} \alpha_i K(x_i, x_j),$$

where $x_j$ is the example being scored, N is the number of support vectors, $x_i$ are the support vectors, $\alpha$ are the support vector coefficients, and K are the kernels. The goal is to make the support vector expansion more compact (with fewer support vectors) and thus reduce storage requirements and make scoring faster. The reduced set expansion can be then defined as:

$$y'_j = \sum_{i=1}^{M} \beta_i K(z_i, x_j),$$

where M is the number of the support vectors in the reduced set, $z_i$ are the reduced set support vectors, and $\beta$ are the corresponding support vector coefficients. The new support vectors and their coefficients are found by minimizing the error of the new expansion:

min $\|y_j - y'_j\|$

The main problem with the reduced set methods is that the approaches are computationally expensive. They require training a full SVM model and subsequently computing a model approximation. Both steps are computationally intensive and place high demands on system resources. Additionally, since this approach is based on post-processing an existing SVM model, scalability with large amounts of data remains unaddressed.

Another approach to reducing model size is Active Sampling Methods. As noted, the number of support vectors in an SVM model scales up with the size of the training data. This property limits SVM's applicability to small and medium size data (<100 K training points). A number of recently developed methods decrease model size by using a fraction of the entire dataset. Since random sampling is very inefficient and produces models of poor quality, the central idea of active sampling is to select a set of informative data points and thus maximize performance subject to model size constraints.

The active learning paradigm can be described as follows:
construct a model on a small random sample;
test the entire training dataset against this model;
select additional data points by analyzing the predictions;
retrain/adapt the model to the new augmented training sample.

The procedure iterates until a stopping criterion is met. In active learning, stopping criteria are usually related to limiting the model size. The build terminates when the upper bound on the number of support vectors is reached. Alternatively, some other qualitative criterion can be used (e.g., there is no significant improvement in model accuracy on a held aside sample).

The objective of prediction analysis is to identify data points that would maximally improve model quality during the next iteration.

Another approach to reducing model size is Data Summarization Driven Methods, such as clustering-based SVM (CB-SVM). CB-SVM is closely related to the active sampling methods and is a clustering-based method for scaling SVM to large datasets. The well-known BIRCH algorithm, a highly scalable clustering algorithm, may be used to decrease the number of training data points presented to SVM. Summarizing the data can be very efficient computationally, however, it may result in loss of resolution and poor accuracy. To overcome this problem, CB-SVM allows finer resolution in regions near the decision boundary. The algorithm constructs two Clustering Feature (CF) trees following BIRCH methodology. One tree summarizes the positive cases, while the other tree summarizes the negative cases. The initial SVM model is trained on the root entries for both trees. The subclusters closest to the margin are 'declustered' thus increasing resolution near the decision boundary. Subclusters far from the boundary would not produce additional support vectors and they are left intact. A new SVM is trained on the augmented data, new candidates for declustering are identified and the process iterates until the clusters near the boundary cannot be further declustered. This technique only works for linear kernels, because the clusters are non-isotropic in the feature space for non-linear kernels.

Another approach to reducing model size is Optimized Random Sampling, which may be well suited to solving SVM optimization problems. Reduced SVM (RSVM) involves a training vector subset being selected from the original body of data and an SVM model being built on the sample. The training patterns are selected at random with the constraint that a point is added to the sample only if it is sufficiently different (measured in terms of Euclidean distance) from the points already selected.

An alternative sampling approach makes use of random sampling techniques developed for combinatorial optimization problems. The initial SVM model is built on a small random sample. Then the points that are identified as violators are given increased weights. They are effectively duplicated in the data to increase their chances of being selected. Another small random sample is subsequently selected (favoring the over-represented violators) and a new model is trained. There is an upper limit on the number of iterations required to train the final SVM. This bound is quasi-linear with the number of training examples.

If a larger dataset is presented, one approach is to subsample down to the maximum practical dataset size. Purely random sampling can often be suboptimal for unbalanced data since some of the targets may be under-represented or even unobserved. There are also practical restrictions on the dataset size that can be processed within a reasonable time. For example, SVM models with non-linear kernels scale quadratically or even cubically with the number of records and are impractical for datasets with more than 100 K records. SVM models with linear kernels are not immune to the problem. SVM linear regression models may scale extremely poorly with increased number of records when the underlying function is non-linear in nature.

The active learning approach, discussed previously in the context of reducing model size, improves build scalability (both for linear and non-linear kernels) on medium to large datasets. An active learning algorithm will be performant on large amounts of data only if it includes an efficient sampling method. If an algorithm requires repeated scans of the entire dataset, scalability with increasing number of records will be poor. However, at most one full scan through the data is required to select a sufficiently large pool of informative examples. Active learning works against this pool of examples. The SVM build via active learning is able to efficiently process very large datasets which are deemed infeasible for standard SVM.

Another approach to improving scalability is incremental learning. Incremental learning is usually considered from two different perspectives where 1) the goal is to incorporate additional information into an existing model without incurring the cost of rebuilding the model from scratch; or 2) the goal is to adapt the model to a stream of data where the underlying distribution may change over time. The first scenario assumes that the data distribution does not change significantly and there is no need to unlearn previously seen records. The second scenario requires a model to track a continuously evolving data distribution. The influence of older records diminishes over time and the model has to forget or unlearn obsolete data.

Both scenarios can be addressed with exact or approximate solutions. The exact approaches guarantee solutions identical (allowing for machine precision and convergence tolerance) to the solutions that would have been achieved if the dataset were presented to the SVM algorithm in its entirety. An example of an exact solution involves an incremental and decremental SVM algorithm that analytically satisfies all KKT (Karush-Kuhn-Tucker) convergence conditions by maintaining an "adiabatic equilibrium". As an example, consider the incremental update mechanism. The SVM model constraints can be expressed as:

$$\Delta g_i = Q_{ic}\Delta\alpha_c + \Sigma_j Q_{ij}\Delta\alpha_j + y_i \Delta b \text{ and } y_c\Delta\alpha_c + \Sigma_j y_j \Delta\alpha_j = 0,$$

where $g_i$ is the derivative of the Lagrangian functional with respect to $\alpha_i$, $\Delta g_i$ is the change required for inclusion of a new example, i is the index of an individual training example, c is the index of the new candidate example added to the model, Q is the kernel convolution of two examples, y is the target value for classification, $\alpha$ are the support vector coefficients, and b is the bias term.

The changes of SVM parameters maintain equilibrium if:

$$\Delta b = \beta \Delta \alpha_c \text{ and } \Delta \alpha_j = \beta_j \Delta \alpha_c, \text{ where}$$

$$\begin{bmatrix} \beta \\ \beta_{k_1} \\ \vdots \\ \beta_{k_s} \end{bmatrix} = -Q^{-1} \begin{bmatrix} y_c \\ Q_{k_1 c} \\ \vdots \\ Q_{k_s c} \end{bmatrix},$$

using k as the index of the non-bounded support vectors.

If the changes introduced by the new example are small enough not to cause non-bounded support vectors to become bounded and vice versa, the method is conceptually easy to implement. If that is not the case, however, it is necessary to introduce a bookkeeping system that tracks the conversions of the support vectors.

Standard SVM algorithms attempt to maximize the margin between the two classes of examples. The non-bounded support vectors lie on planes where the margin equals 1. In Proximal SVM (PSVM), the standard SVM problem is simplified by replacing the inequality constraints in SVM's formulation with equality constraints. That is, SVM's optimization is traditionally defined as:

$$\min(\langle w.w \rangle + C\Sigma\|\epsilon_i\|), \text{ subject to } y_i(\langle w.w \rangle + b) \geq 1 - \xi_i,$$

where $\xi$ are the non-zero slack variables.

In PSVM, the constraints are modified to:

$$y_i(\langle w.w \rangle + b) = 1 - \xi_i$$

The effect of the change is that the SVM problem can be solved as a system of linear equations instead of as a quadratic optimization problem. This restatement of the problem results in non-sparse SVM models—all examples have non-zero coefficients. The training examples are clustered around the planes where the margin equals 1. PSVM attempts to minimize the distance of the points from each class to the plane around which they are clustered and, at the same time, it attempts to maximize the distance between the two planes. This approach is equivalent to regularized least-squares regression.

For linear models, the lack of sparsity does not necessarily pose a serious problem—the model can be stored as an array of linear coefficients and therefore the model size remains constant. However, for non-linear kernels, it is necessary to keep the number of support vectors reasonably small and pre-selection of a sample following RSVM's methodology is recommended.

Apart from simplifying the SVM learning task, Proximal SVM is amenable to incremental/decremental as well as distributed learning. This is easily illustrated by the form of PSVM's solution:

$$\begin{bmatrix} w \\ b \end{bmatrix} = \left( \frac{1}{C} + E'E + (E^i)E^i - (E^d)E^d \right)^{-1} (E'y + (E^i)y^i - (E^d)y^d),$$

where w is the set of attribute coefficients for linear kernels (or the set of kernel coefficients for non-linear kernels), b is the bias term, C is the capacity, I is an identity matrix, and y is the target value vector. The matrix E is defined as:

$$E = [A - e],$$

where A is either the data matrix (linear kernels) or the kernel matrix (non-linear kernels), and e is a vector of ones. The indices i and d identify the data examples that need to be incrementally added (i) or decremented/unlearned (d). The process is data parallel and can be distributed across different machines. The presented form is suitable for data sets with a relatively low number of dimensions, d, since it requires an inversion of a matrix d×d. For cases with a high number of dimensions (e.g., text mining, life sciences), there is an alternative formulation that requires an inversion of an n×n matrix where n is the number of examples. The incremental mechanism is applied to the column computation and learning is column-distributed instead of row-distributed. Further optimizations include efficient computation of multi-class/multi-target problems by reusing the results of the previously computed models. Unfortunately PSVM is not a good general solution because it does not work well with unbalanced data for multi-class problems.

Approximate approaches do not always produce results that are as accurate as those from a standard SVM model.

Still, approximate methods have the advantage of speed and simplicity, and the quality of results is generally acceptable for the majority of the applications. A simple alternative to the standard chunking mechanism in SVM is where, after learning a chunk, only the support vectors are retained and learning continues on the unseen examples. As a result, the final model does not converge on the entire dataset but only on a fraction of the examples. The approach is similar in spirit to shrinking without verification of convergence on the shrunk examples at the end of learning. This paradigm can be applied to incremental learning by treating the new data as a new chunk. The method is sensitive to the order of presentation of the training examples.

All incremental methods described thus far deal with batch learning. Alternatively, one can assume that there is a (possibly infinite) stream of data that needs to be processed. It is computationally infeasible to keep growing the model over time, so the stream methods do not attempt to find a global solution over time. Instead, they age out old records and produce an approximate solution that reflects the most recent examples. One approach is an online method that performs a stochastic gradient optimization with a weight decay type of regularization. At each iteration, the kernel expansion can grow by one term and its kernel coefficient minimizes the empirical error estimate. The other (older) coefficients decrease monotonically at a predetermined decay rate. The update rules are given by:

$$\alpha_t = -\Lambda c'(x_t, y_t, f(x_t)) \text{ and } \alpha_i = (1-\lambda\Lambda)\alpha_i,$$

where t is the index of the current record, i is index of the previously seen records, $\Lambda$ is the learning rate, c is an empirical error estimate, $f(x_i)$ is the model prediction, y is the target value, and $\lambda$ is the complexity parameter. The support vector coefficients are truncated when they become sufficiently small. There is an upper error bound for this type of algorithm.

Another approach is a gradient-based online regression algorithm. The idea is to add new support vectors only if the new example cannot be expressed as a linear combination of the already existing support vectors. Tests of linear independence were previously used to reduce SVM model size as a post-processing step after build. The algorithm uses an online procedure where each new example is tested for "approximate linear independence". The approximate linear independence condition can be expressed as:

$$\delta_t = \|\Sigma_j \alpha_{t,j} \phi(\tilde{x}_j) - \phi(x_t)\|^2 \leq v,$$

where t is the index of the current example and $\alpha$ are the weighting coefficients for the linear combination of basis vectors. If the current example can be approximated to within a squared error of v, then the record is not considered a support-vector candidate.

Only examples that do not pass the independence test can be incorporated as support vectors. Efficient representations of the kernel matrix can be used and the data vector activations (model scoring results) that require storage of matrices with dimension equal to the number of support vectors currently in the model. A potential problem with the approach is that the model will continue growing over time and there is no unlearning mechanism available.

Another extension to RSVM involves, instead of randomly preselecting the candidate support vectors, incrementally increasing the pool of candidates using an information criterion. Essentially, they check for linear independence in the new examples by solving a least-squares problem. The algorithm can operate sequentially (adding one example at a time) or in batch mode. While the proposal can be considered an improvement over the standard RSVM algorithm, many of the basic problems with PSVM/RSVM remain unaddressed—unbalanced data handling, outlier sensitivity, and multi-class models.

The incremental learning paradigm allows for model refinement and model correction under the assumption that the underlying data distribution for a given target does not change dramatically. Under the assumption of stationarity, new data does not negate the information presented on previous training sessions. The model is able to extract additional information from new data and incorporate it by refining the boundary between classes. Such refinements are expected to improve the generalization performance. On the other hand, if the underlying process is quasi-stationary, the model will become biased towards recent data. The reason for this bias is that the existing SVM model will be relying only on support vectors to encode previously seen data. Records that were not selected as support vectors during previous builds will not affect subsequent training sessions. Such records will effectively be forgotten by the model. Thus there is an inherent bias towards recent records and small shifts in the distribution will be incorporated into the model.

The paradigm described here does not have an explicit forgetting mechanism. That is, support vectors in the model will not be retired on the bases of their timestamp. As a result, SVM, even in incremental mode, will not be able to track a constantly evolving distribution. Thus, for non-stationary data, rebuilding the model is recommended. For multi-target models, if the non-stationary behavior is restricted to individual targets, these targets could be deleted or added, as appropriate, through the incremental mechanism while leaving the rest of the model intact.

SVM incremental model update will be appropriate under several scenarios:
- Not all data are available at the time of the initial build—as more information is collected, the model is updated without incurring the cost of training it from scratch.
- The build dataset is of considerable size and a single model build on the entire data is expected to take an unacceptable amount of time—the training data can be broken down into chunks and the model will learn the chunks incrementally
- Users provide the model with feedback based upon their interactions with the model.

Incremental learning uses the new examples and the existing support vectors to create a training dataset. The algorithm gives equal weight to each new data point and each support vector from the original model. If the user chooses to provide corrective feedback information in order to improve model performance, there is no guarantee that incremental learning will ensure correct prediction of the examples provided by user feedback in the updated model. If an example is a strong outlier with respect to the model internal representation, the prediction of the updated model may not change. In order to achieve good generalization performance and avoid learning noisy data, the SVM algorithm allows for errors on the training data. Repeated presentation of the same examples will result in model bias and increase the likelihood that these cases will be predicted correctly increases. However, creating such bias may also cause other, previously correctly classified, examples to be misclassified by the updated model.

Incremental model update for SVM can be used for multi-target binary models. In multi-target binary problems, a single training example may be assigned to multiple targets. SVM builds an independent binary model for each target. A training example is considered a positive instance for each of the targets with which it is associated and a negative instance for all other targets. The negative instances are also referred to as counterexamples. Thus each training example is considered as either a positive case or a counterexample during the model builds for each target.

Following the same line of reasoning, incremental learning for multi-target binary problems also assumes that a training case is a positive instance for the targets with which it is labeled and a counterexample for every other target. A new training case, presented during incremental learning, will be used as either a positive or negative instance for all existing binary models. That is, each binary model will be updated to incorporate the new example. This behavior is consistent with SVM's training case treatment within the multi-target non-incremental framework.

Incremental model update works seamlessly with the active learning approach. Reducing the number of support vectors has a great impact in the context of incremental model updates. Active learning considerably speeds up model updates with negligible or small loss of accuracy. In general, scoring performance for linear models is affected by reduced model size since it depends on the number of non-zero attribute coefficients and not on the number of support vectors. An exception to this occurs with sparse data (e.g., text mining) where fewer support vectors are likely to produce fewer non-zero attribute coefficients per binary target and therefore faster models.

Standard supervised binary classification algorithms require the presence of both positive and negative examples of a target class. The negative examples are often referred to as counterexamples. In some domains, it is a challenge to provide a useful and representative set of counterexamples. The problem exists mostly in cases where the target of interest is easily identifiable but the counterexamples are either hard to specify or expensive to collect. A typical case is text document classification. It is easy to classify a document under a given topic. However, the universe of documents not belonging to this topic can be very large and it may not be feasible to provide informative counterexamples.

One-class SVM was initially used as an estimator of the support of a distribution. The goal is to estimate a function that will be positive if an example belongs to a set and negative if the example belongs to the complement of the set. Regularization is achieved by controlling the length of weight vector in the associated feature space. The method does not attempt to estimate the distribution density. Instead, it computes a binary function that identifies regions in the input space where the majority of the data lives.

The data points are mapped into the feature space via kernel transformations. The strategy is to separate the data from the origin in dual space with maximal margin. Different types of kernel functions result in a variety of nonlinear estimators in the input space. Then standard SVM methodology can be applied. For certain domains, the input vectors are scaled to a unit length (e.g., text mining). In such cases, it is possible to use linear kernel SVM models to discriminate against the origin following methodology. This linear approach would be practical only for data of high-dimensionality.

An alternative formulation of the problem Support Vector Data Descriptions (SVDD) is where the data is described by spheres in feature space. The SVM functional is given by:

$$\min_{R,\xi} R^2 + C\sum_i \xi_i, \text{ subject to } \|\Phi(x_i) - c\|^2 \le R^2 + \xi_i,$$

where R is the radius of the sphere containing the bulk of the data points, $\Phi(x)$ is the image of the data vector in feature space, and c is the center of the sphere. The first term achieves regularization while the second term minimizes the empirical risk. The decision function takes the form:

$$f(x) = \text{sgn}\left(R^2 - \sum_{i,j} \alpha_i \alpha_j K(x_i, x_j) + 2\sum_i \alpha_i K(x_i, x) - K(x, x)\right),$$

where x is the scored example and i and j are support vector indices. Linear kernels are only appropriate for spherical data distributions. Non-linear kernels can be used to model domains of different shapes. While SVDD has interesting properties, the alternative problem formulation makes its integration into an existing SVM framework more challenging.

One-class SVM models will be built under two scenarios: 1) all training examples belong to a single class; and 2) a novel target is presented to a multi-target model during incremental model update with all records in the new data being instances of the new target.

At apply time, the model produces a prediction and an associated probability whether the new example is a typical representative of the class of interest or not. A prediction value of 1 indicates that the example can be considered typical while a prediction value of 0 classifies the example as an outlier. Similarly to standard binary classification, it is possible to choose a probability decision threshold different from 0.5 thereby changing the outlier cutoff point. Alternatively, it is possible to consider the ordered list of class 1 predictions (ordered by probability) and examine the most typical cases (TopN predictions) or largest outliers (BottomN predictions).

The rate of negative predictions can be controlled via two parameters: outlier rate and complexity factor. The outlier rate sets the desired rate of negative predictions on the training data. The SVM algorithm will attempt to achieve the desired rate within certain degree of precision. Once the model is built, the outlier rate on unseen data from the same distribution is expected to be similar to that on the training data. If the distribution of the apply data changes (e.g., the distribution is augmented with counterexamples), the outlier rate is the expected to reflect the false negative rate—the number of positive cases that will be incorrectly classified as negative. Often a domain expert can provide a good estimate of the typical false negative rate. Such rate will produce a one-class SVM model with a good operating point.

The complexity factor parameter controls the capacity of the model and also has a direct effect on the rate of negative predictions. Increasing the complexity factor creates models with lower rate of negative predictions. The complexity factor mechanism allows for a finer and more controlled grid search than specifying the outlier rate parameter directly.

It should also be noted that the geometry of one-class optimization places certain requirements on the input training data. One-class models with a linear kernel require that the data records be normalized to unit length. While such data is common for certain types of applications (e.g., text mining), in other cases the unit length normalization will have to be performed internally. In order to perform meaningful internal unit length normalization, the individual attributes need to be on a similar scale.

The behavior is the following: if one-class learning is required and the kernel is linear, the algorithm will internally perform unit-length normalization unless a flag is passed to the table function indicating that the data is already unit length normalized. Non-linear kernels would not require special data preparation. Linear kernel models are expected to be useful in one-class context only when the dimensionality of the input space is sufficiently high. If that is not the case, non-linear kernels must be the preferred option.

Using unit-length normalization with linear kernels will make SVM's linear coefficients less intuitive and harder to interpret in terms of attribute units and scale. However, even if this is not a typical linear model, the coefficients would still be useful for analysis in terms of the size of attribute relative impact and the sign of that impact (either positive or negative).

A new, previously unseen, target can be added to an existing multi-target model using the incremental model update mechanism. Novel targets and additional data for old targets would be handled appropriately from the algorithm point of view and transparently from the user perspective. The user would be allowed to provide all newly available data (records for new and/or pre-existing targets) for model update in one single incremental session.

Adding a new target to an existing model requires special handling from algorithm point of view. It would be unreasonable to assume that all previously existing support vectors in an SVM model represent counterexamples to the new target since this target did not exist at the time these records were labeled. Ideally, the old records should be re-labeled with respect to the new target and the model should be rebuilt. However, re-labeling old records with the new target and rebuilding the model from scratch would place an unreasonable burden on the user. To address this problem, a one-class approach is adopted—if all new training examples in an incremental batch belong to a novel target, a one-class SVM model will be built for the new target and added to the collection of binary models for the other targets. The one-class model would estimate a function that predicts membership in the new target if the example belongs to a set and non-membership if the example belongs to the complement of the set. The support vectors already in the SVM model will not be used as counterexamples.

Building a one-class model does not require the presence of counterexamples. It has been shown, however, that one-class models are generally inferior to models built with counterexamples. Therefore one-class models would only be built if every example in the incremental batch belongs to the same previously unseen target. If some of the records in the incremental batch are associated with different targets, they will be used as counterexamples. For instance, if besides the new target examples, the incremental batch contains additional records for other older targets, these records will be used as counterexamples for the new target. The approach also allows for more than one novel target to be introduced simultaneously—the records associated with one of the new targets will be treated as counterexamples for the other new targets. The presence of counterexamples would make building one-class models for the new targets unnecessary.

Introducing a novel target as a one-class model can be considered a bootstrapping mechanism when counterexamples are not readily available. Even if a given target starts as a one-class model, subsequent incremental learning sessions are likely to provide counterexamples and the model for this target will evolve into a standard binary classification model. It should be noted that the binary models for already existing targets will always be updated during incremental learning even if the incremental batch contains no positive instances of a given target. That is, all pre-existing binary models will be updated using the new cases as either positive examples or counterexamples. The new cases from the incremental batch would be used together with the support vectors of a target to produce a refined model.

To improve usability and avoid frequent model rebuilds, the user can remove a target from an existing SVM multi-target classification model. Even if a target is of no interest, the user incurs the cost of scoring this target and filtering it subsequently. Deleting a selected target reduces the size of the model. It speeds up scoring and eliminate prediction filtering for obsolete targets. The delete target capability can be used as a standalone feature or in conjunction with incremental learning.

A fraction of the Lagrangian coefficients need to be initialized appropriately to meet this condition. The coefficients initialized with non-random values are selected at random.

Error bars are the standard means of estimating the uncertainty associated with the predictions of a regression model. Error bars are generally computed at user-specified level of confidence. For example, in least-mean-squares linear regression, the error bar estimation represents an integral part of the process.

The SVM regression model uses an $\epsilon$-insensitive loss function during optimization. Any points that fall within the $\epsilon$-tube are not considered errors and do not become support vectors. A weakness of the SVM regression framework is that is does not allow for error bar estimation. SVM regression may be cast as a Gaussian process and may employ Bayesian methods to derive error bar approximations. The prediction error has two components—1) variance inherent to the SVM model, and 2) variance due to the intrinsic noise in the data. The second component can be expressed using $\epsilon$ and the complexity parameter:

$$\sigma_{C,\epsilon} = 2/C^2 + \epsilon^2 (C\epsilon+3)/(3(C\epsilon+1)).$$

If $\epsilon$ and complexity were appropriately selected, they already capture the intrinsic noise in the data. The variance in prediction due to model uncertainty can be expressed as:

$$\sigma_{K_M} = K_{zz} - K_{X_M z}^T K_{X_M, X_M}^{-1} K_{X_M z},$$

where z is the scored record, M is the number of support vectors, and K is the kernel function. The computation requires storage of the model support vectors. If the number of support vectors is large, the inversion of the kernel matrix may become a computationally expensive operation with high demands on memory. Therefore, error bars estimation for SVM models will be feasible only for models of moderate size. Restricting the SVM model size is a prerequisite for enabling error bar computations.

SVM non-linear kernels allow mapping the input data into a high-dimensional feature space. The high-dimensional space allows the problem to be treated as linearly separable. A common non-linear kernel type is Gaussian kernel functions. Gaussian kernels are often preferred over other non-linear kernels since they capture the local behavior of the data well. In addition, Gaussian kernels have a single tunable parameter and they have desirable numerical properties—they are bounded and there are no overflows. However, Gaussian kernels rely on Euclidian distances and this can be problematic in high dimensional input spaces. Other popular kernel types are also available, such as polynomial and sigmoid kernels.

SVM kernel functions need to satisfy Mercer's conditions to be considered admissible kernels. Admissible kernels must have positive semi-definite kernel matrices. The SVM optimization in the dual space is guaranteed to find the global minimum in the primal space only for admissible kernels. Examples of such kernels are Gaussian and polynomial. Polynomial kernels have been shown to produce better models than Gaussian kernels on certain types of data. However, to incorporate polynomial kernels in the SVM product, one has to address the potential numerical instabilities and devise strategies for tuning three kernel parameters. The sigmoid kernel matrix is positive semi-definite only for certain kernel parameter choices. As a practical matter, any method estimating the two sigmoid kernel parameters must take into account the admissibility constraints. This is a non-trivial task.

The present invention provides automatic selection of appropriate kernel type based on a simple property of the data: the effective dimensionality. High dimensional data is likely to be linearly separable, because of the inherent degrees of freedom. Hence linear kernels are often an appropriate choice. Low dimensional data, with fewer degrees of freedom, may require more powerful kernels to achieve an accurate fit.

The following sections will outline several usage scenarios.

Active learning case—a typical business problem has a moderate number of attributes and a large number of records. The low dimensionality requires the usage of a non-linear kernel. A non-linear SVM model build on a dataset of large size has typically many support vectors. Such a model would be too slow to use for scoring large amounts of data or in an online scoring application. Building an SVM model with active learning enabled, would produce a smaller model (possibly at the cost of somewhat poorer accuracy). The new model will have significantly better scoring performance.

One-class models can be used to rank data points on the basis of how typical they are with respect to the training data distribution. This ranking can be then used to identify the N largest outliers—the examples with lowest probability for prediction=1 (for all examples, we consider their probability of being positive). In this scenario, the key requirement is that the model provides a reliable ranking. Looking for a probability decision threshold to act as an outlier cutoff point is not strictly necessary. Often, only the strongest N outliers need to be identified—for example, due to limited resources, only a small number of outlier cases can be investigated.

The outlier detection methodology relies on building a model that identifies correctly the large body of the data. The probability ranking reflects the relative distance of the outlier points from the bulk of the distribution. To process a predetermined number of outliers (e.g., 1% of the data), the user can either set the desired outlier rate during build or can use the probability ranking of the apply output and select the desired number of cases from the ranked list. The latter approach is, in most cases, the preferred option.

Anomaly detection has a different objective from outlier detection—it tries to discriminate between cases that belong to the distribution of the training data and examples from a novel unseen distribution. For example, a network intrusion detection model can be built on data points capturing normal patterns of behavior. Such a model should be able to detect previously unknown deviations from the normal behavior (e.g., new types of attack) and trigger alarms. Under this scenario, the user is expected to specify during the model build an acceptable outlier rate (rate of incorrect negative predictions). Essentially, the model trades the two types of errors—incorrect negative predictions (false negatives) and false alarms (false positives). Setting a very low outlier rate may results in a high number of false alarms which require investigation. A domain expert can often provide a good estimate of an appropriate false negative rate. Once the outlier rate is specified the one-class SVM model optimizes the decision boundary that will achieve good discrimination between the training data distribution and the unknown set of counterexamples.

It should be noted that for one-class models in general (both types of kernels), it is recommended that the user transform individual data attributes to a similar scale (e.g., by using min_max normalization). If attributes are on a different scale, the kernel computation will be dominated by the attributes on higher scales. This effect is usually undesirable.

A multi-target SVM model is built to classify a collection of documents. Over time more data may become available. The model will be updated periodically via the incremental learning mechanism without incurring the expense of building it from scratch. User feedback will be also incorporated into the model via the corrective learning option. As the document collection evolves, some of the targets may become obsolete and they will be removed from the model via the delete target API. When a new target emerges, it will be added to the model using incremental learning. This will allow the maintenance of a powerful and flexible SVM model.

An exemplary software block diagram of a database management system 100 incorporating the present invention is shown in FIG. 1. The SVM algorithm is part of the data mining functionality 102 of the database management system. The data mining functionality 102 represents a collection of PL/SQL procedures, C table functions, and C kernel code. The layering of the individual components is shown in FIG. 1.

The dbms_data_mining package 102 provides public interfaces for model creation, scoring, deletion, renaming, export/import, and other test utility functions. These operations are invoked through a dbms_data_mining_internal wrapper 104. The SVM algorithm module is implemented as a trusted C table function and C kernel code 108. The adaptors 106 are internal modules that transform the input data into an appropriate format for the internal table function API. For SVM, the adaptor code performs remapping of attribute names to attribute ids, remaps target values in classification, and explodes categorical attributes into a collection of binary numeric attributes. The public PL/SQL API accepts 2D tables or views which can have nested table columns. In addition to mapping, the adaptor also un-nests nested table columns.

The dictionary 110 consists of tables that maintain metadata about models. Models behave like schema objects through this dictionary even though they are not schema objects in the RDBMS.

Figure 2:
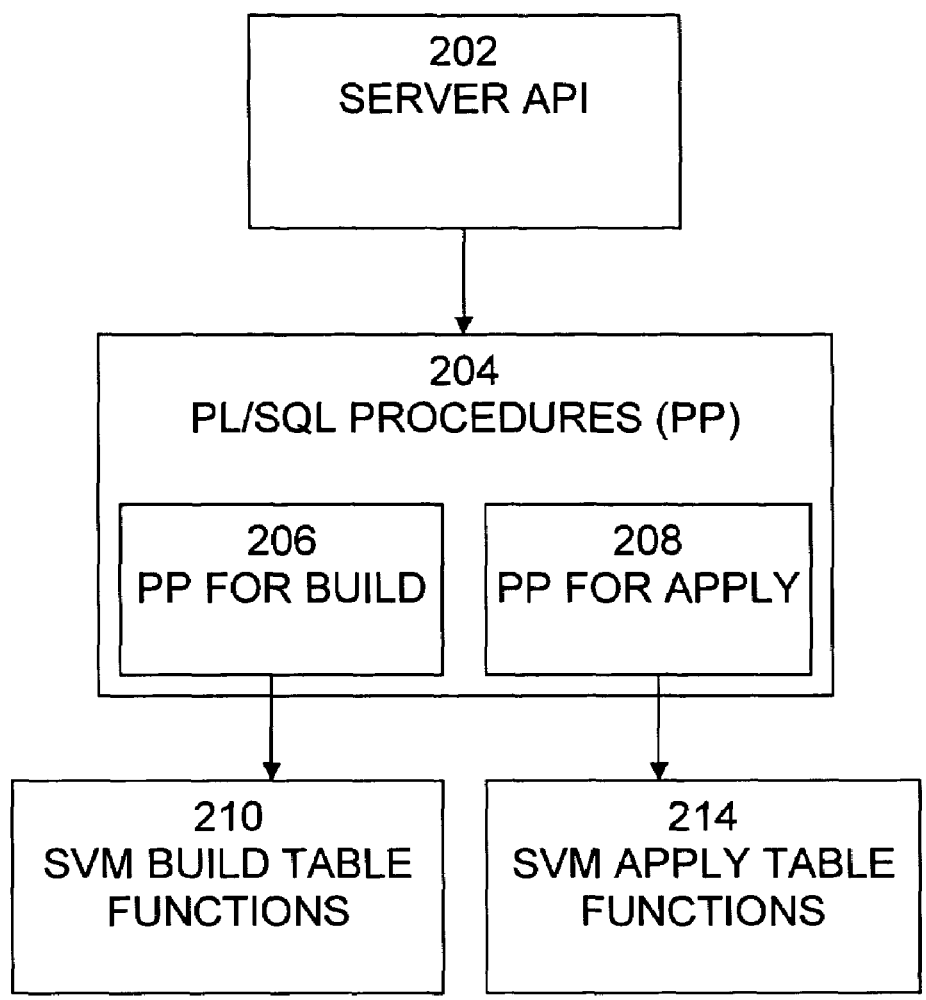
FIG. 2 is exemplary block diagram of an implementation of SVM.

An example of an implementation 200 of SVM, according to the present invention, is shown in FIG. 2. Exemplary implementation 200 includes a PL/SQL server Application Programming Interface (API) 202, PL/SQL packages 204, and SVM table functions 210 and 214. The server API 202 for SVM may be composed of several PL/SQL procedures that allow the user to construct a specification for an SVM model as the result of a build task and to score models already stored in the RDBMS. The outputs from server API 202 are passed to the PLS/SQL procedures 204.

The PL/SQL procedures 204 includes two main functions—procedures for build 206 and procedures for apply 208. The procedures 204 for the build process acts as a wrapper to the Table Function routines 208 for SVM model build and basically performs preprocessing of input data The build PL/SQL procedures may be invoked with parameters such as the table name for build input data, the name of the mining function the build function is to use to build the SVM model, the name to be given to the model when persisting the model, and the name of a table with the function settings and algorithm settings.

Figure 3:
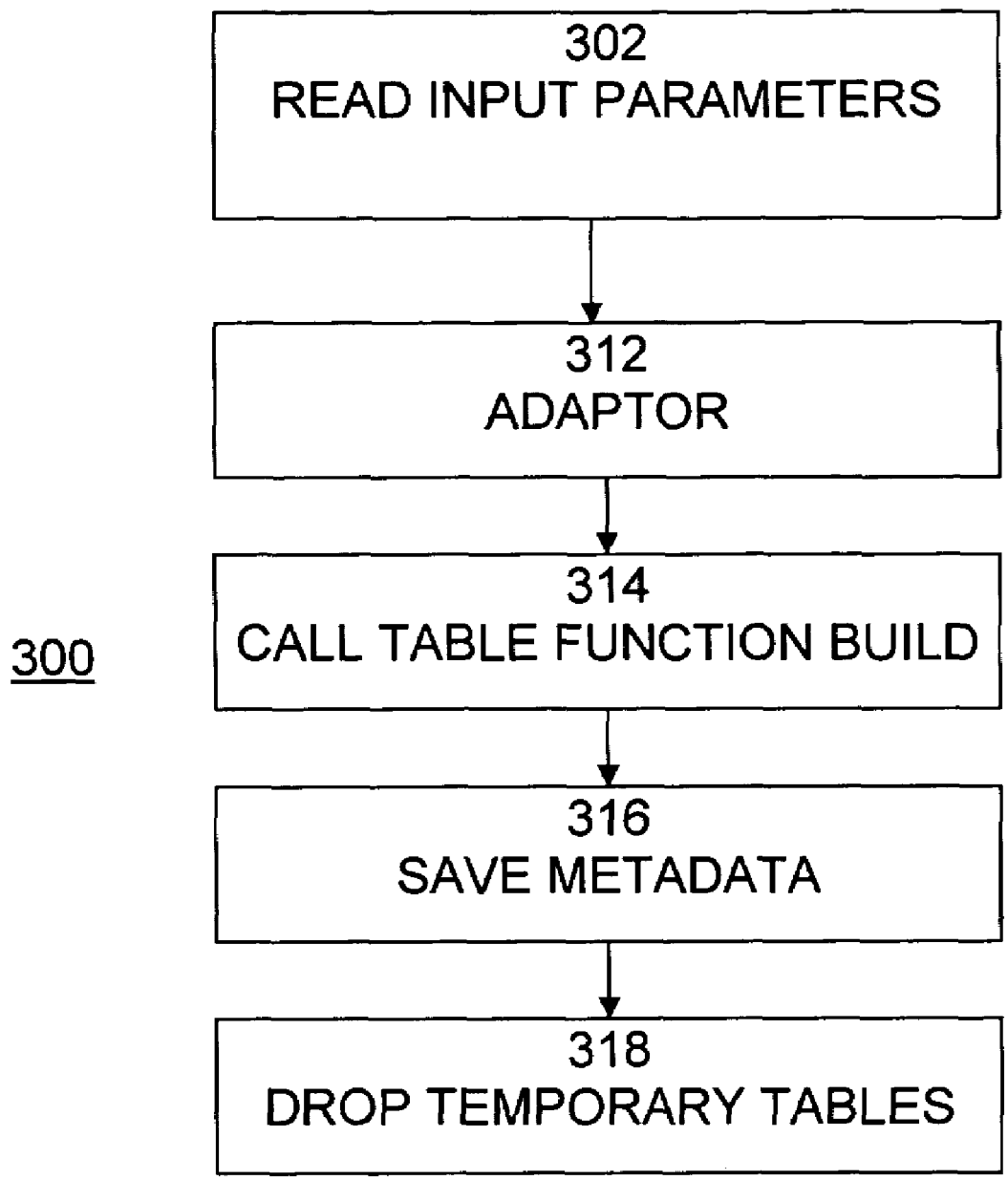
FIG. 3 is an exemplary flow diagram of a process of building an SVM model.

The PL/SQL procedures 204 for build may perform processing 300 such as that shown in FIG. 3. Processing 300 begins with step 302, in which input parameters, such as mining function settings and algorithm settings are read. In step 312, the input data table is prepared by un-nesting nested columns, mapping attributes, and exploding categorical attributes. In step 314, a Table Function build routine is called to build an SVM model. In step 316, the metadata resulting from the model build is saved to in the RDBMS. In step 318, the temporary tables used by the adaptor module 312 are dropped.

The PL/SQL procedures for the apply process acts as a wrapper to the SVM Apply Table Function.

Figure 4:
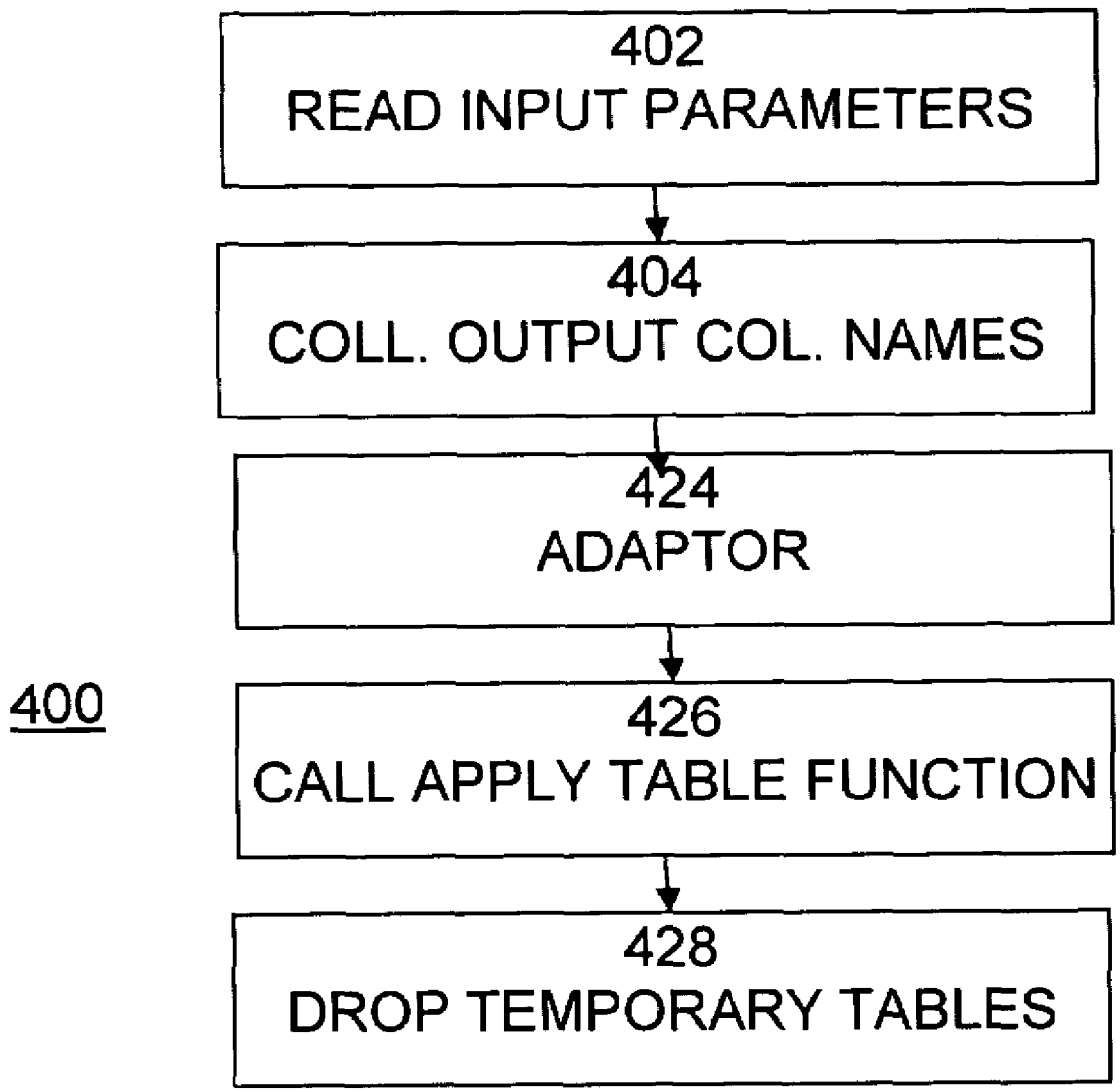
FIG. 4 is an exemplary flow diagram of a process of applying an SVM model.

The PL/SQL procedure 204 for apply may perform processing 400 such as that shown in FIG. 4. Processing 400 begins with step 402, in which input parameters, such as the table name for apply input data, the name of the model upon which the apply function is to be performed and the name of the output table are read. In step 424, the input table data categories are exploded into a set of binary columns, nested table columns are un-nested, and the attributes are mapped to numbers if necessary. In step 426, the apply table function routine is called to apply the SVM model. In step 428, the temporary tables created by the adaptor module are dropped.

Figure 5:
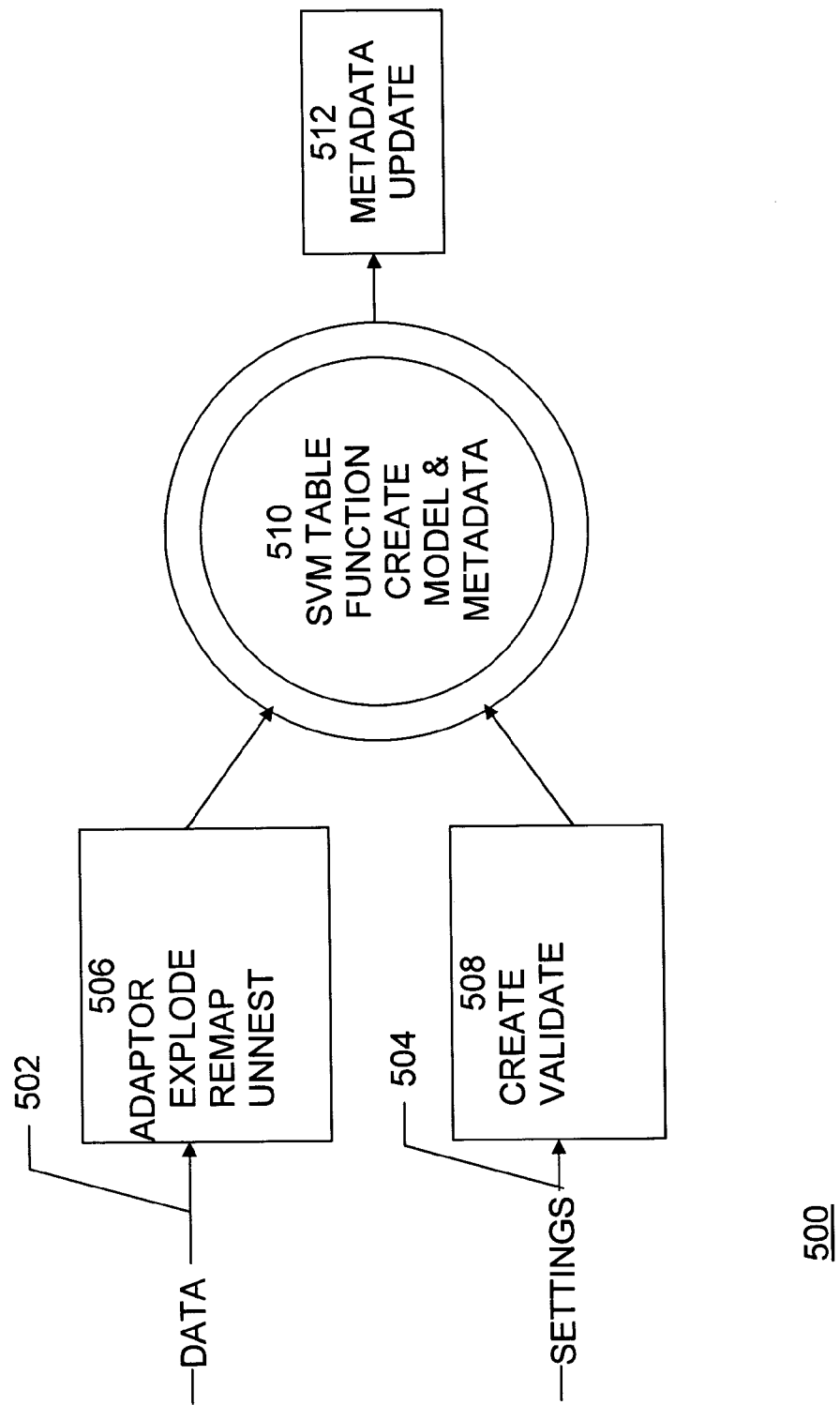
FIG. 5 is an exemplary flow diagram of processing performed by a Table Function build routine to build an SVM model.

The processing performed by the Table Function build routine to build an SVM model in step 314 of FIG. 3 is shown in more detail in FIG. 5. There are two inputs to the build function—training data 502 and settings 504. For SVM, preferably the numerical columns are appropriately normalized/scaled in order to 1) avoid biasing the model toward attributes with larger original scale and 2) avoid numerical instabilities within the algorithm. The adaptor module 506 performs additional internal data manipulations that include exploding categorical attributes into binary numeric attributes, remapping all attributes (including the ones resulting from explosion) to attribute ids, and remapping the target values for classification. If the input table/view has nested columns, the adaptor performs un-nesting, categorical explosion, and remapping.

The second source of user input is a setting 504. The settings allow the user to customize the model build. If the user does not provide settings, internal default values are used. The module 508 creates and validates an internal settings table based on user provided and/or default setting values.

The transformed data and settings cursors are used as inputs to the SVM internal table function 510. Information passed to the table function includes the model name, a mining function parameter that specifies whether a classification or regression model should be built, and other information. The table function 510 creates model data tables and makes metadata entries in the data mining dictionary. The actual output of the build—the data mining model—is created and persisted to the database. The table function 510 creates and persist the model data and then registers the model in the metadata.

Once the build completes successfully, the build procedure performs model metadata updates 512 (e.g., total build duration, target column name, case id column name, data table name). Finally, the internal mapping transformations carried out by the adaptor is added to the model data.

Figure 6:
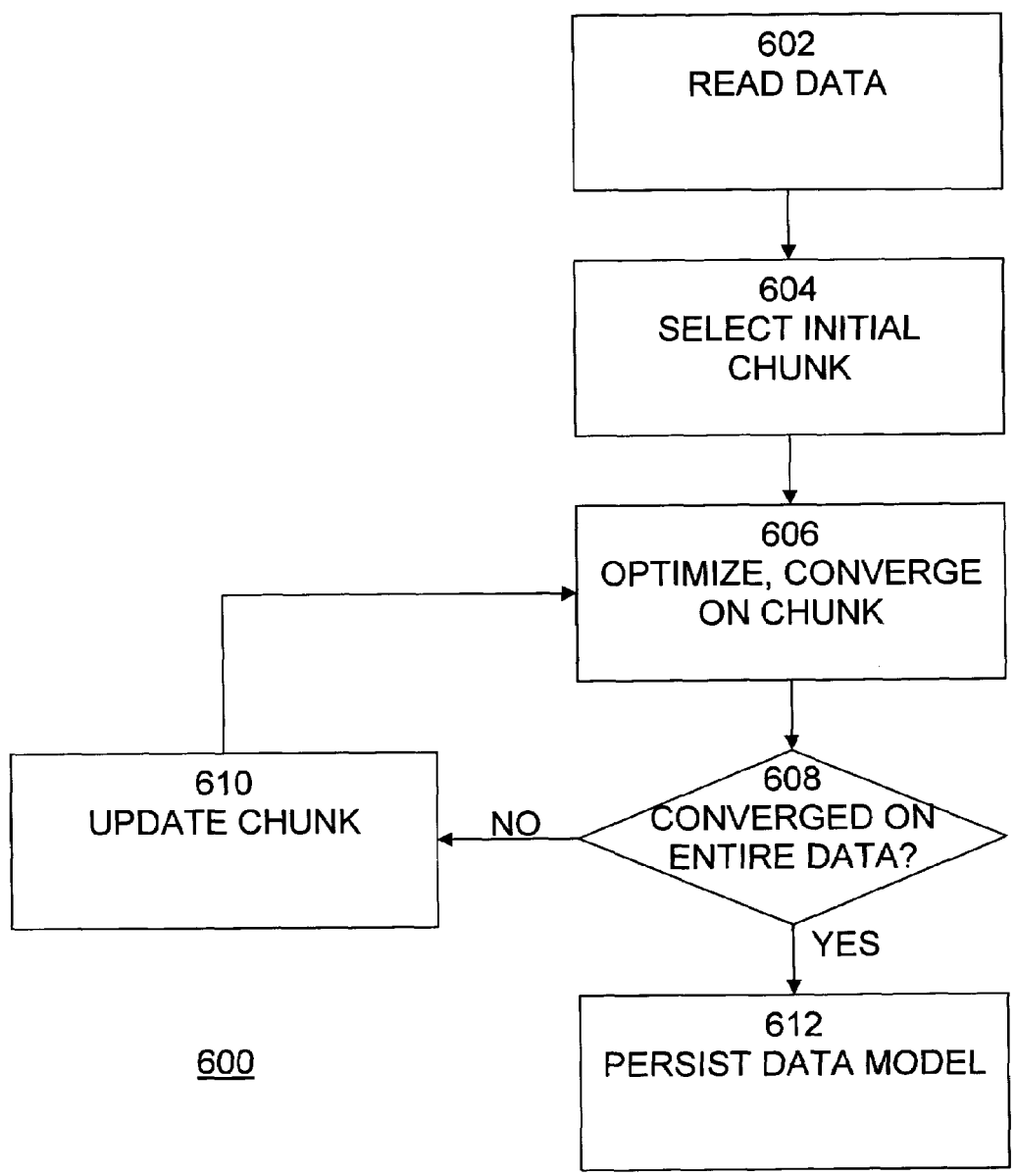
FIG. 6 is an exemplary flow diagram of a process flow for building standard SVM models in a table function.

The process flow 600 for building standard SVM models in the table function 510 is shown in FIG. 6. The standard approach may be used for models where active learning is turned off. The standard approach may also be used for the entire range of SVM models, including binary, multi-class, multi-target classification, and regression. A similar process may be performed for SVM models built using kernel code.

Process 600 begins with step 602, in which the training data is read into memory. If the data set is large, only a fraction of the data will be retained. The data that is retained will be treated as the 'entire' dataset from algorithm's point of view due to the expense of multiple reads of the data from disk. In step 604, an initial chunk of data is selected. The chunk of data on which the algorithm operates is often referred to as working set. Preferably, the initial chunk is a random sample of the data and, in the case of classification, stratified with respect to the target distribution.

In step 606, SVM optimization is performed on the selected chunk. For non-linear kernels, the size of the chunk is such that the kernel cache can be stored in memory. The size of the kernel cache is an algorithm setting. Once the SVM algorithm converges on the selected chunk, then in step 608, the convergence conditions are checked on the entire data set. If some of the data outside the chunk violates the convergence criteria, then the process continues with step 610, in which the chunk is updated by including some of the violators. Thus, the updated chunk includes the members of the previous chunk and some of the violators. Then the algorithm converges on the new chunk and checks for violators. The process iterates until the convergence criteria are met on the entire data.

If the convergence criteria are met on the entire data, then the process continues with step 612, in which the model is persisted and the algorithm exits. Model persistence consists of storing the model data into IOTs and creating model metadata. The model data is preferably persisted as IOTs in order to ensure fast model load during scoring.

Figure 7:
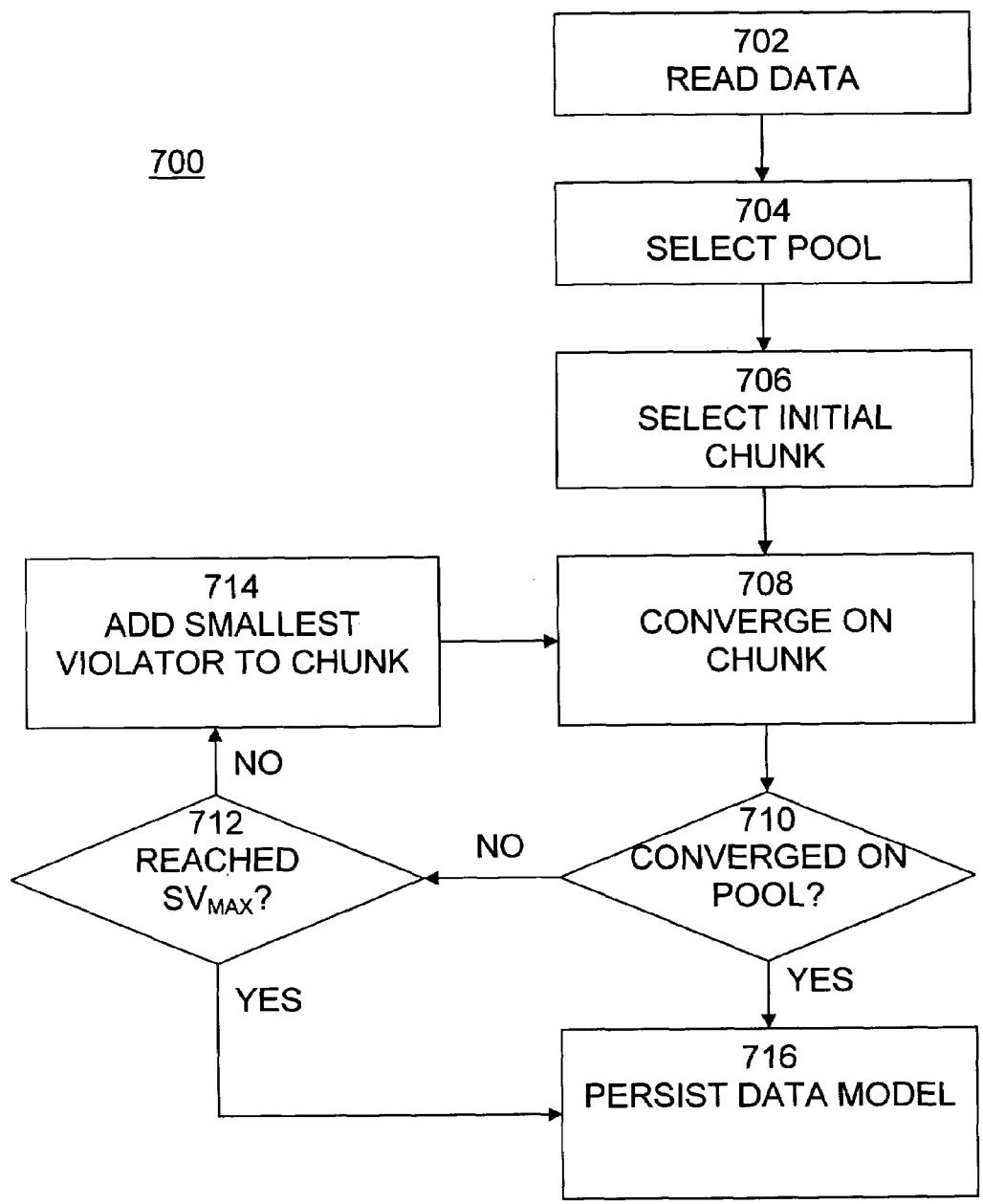
FIG. 7 is an exemplary flow diagram of a process flow for building SVM models in a table function using active learning classification.

The process flow 700 for building SVM models in the table function 510 using active learning classification is shown in FIG. 7. The active learning method addresses the inherent scalability problems of the standard SVM optimization approach. Instead of trying to converge on a large body of data, active learning attempts to restrict optimization to the most informative examples. These examples are selected from a larger pool. Under active learning, the build is significantly faster and the resulting model is significantly smaller. FIG. 7 illustrates the active learning process flow 700.

In active learning classification, the basic idea is that the working set/chunk is increased by one example at a time (standard SVM models use a fixed chunk size). Among the examples that violate convergence conditions, the one that is closest to the decision boundary is added to the chunk. The assumption is that the model built on the initial chunk is of reasonable quality and only need to be further refined rather than dramatically altered.

Process 700 begins with step 702, in which the training data is read into memory. If the data set is large, only a fraction of the data will be retained. The data that is retained will be treated as the 'entire' dataset from algorithm's point of view due to the expense of multiple reads of the data from disk. In step 704, the process identifies a data pool of limited size that is used as a source of examples for the active learning. The pool represents a subset of the reservoir of all data, stratified with respect to the target. In step 706, an initial chunk of data is selected. The chunk of data on which the algorithm operates is often referred to as working set. This chunk should be a random sample of the data in the selected pool which is stratified with respect to the target distribution. This applies to both regression (stratified via a target histogram) and classification.

In step 708, SVM optimization is performed on the selected chunk. For non-linear kernels, the size of the chunk is such that the kernel cache can be stored in memory. The size of the kernel cache is an algorithm setting. Once the SVM algorithm converges on the selected chunk, then in step 710, the convergence conditions are checked on the entire data pool. If some of the data in the pool that is outside the chunk violates the convergence criteria, then the process continues with step 712, in which it is determined whether the maximum allowed number of support vectors, $SV_{max}$, has been reached. If the maximum allowed number of support vectors, $SV_{max}$, has not been reached, then the process continues with step 714, in which the chunk is updated by including the example closest to the separating plane that violates the convergence condition. Then the algorithm converges on the new chunk and checks for violators. The process iterates until the convergence criteria are met on the entire selected data pool.

If the convergence criteria are met on the entire selected data pool, then the process continues with step 716, in which the model is persisted and the algorithm exits. Model persistence consists of storing the model data into IOTs and creating model metadata. The model data is preferably persisted as IOTs in order to ensure fast model load during scoring.

The active learning approach for classification does not directly translate to regression. The geometry of the $\epsilon$-tube solution requires a modified method of example selection. One possibility is to add the worst violator in the pool to the working set until the upper bound on the number of support vectors is reached. This method is equivalent to finding the $\epsilon$ value that would produce the required number of support vectors. Unfortunately, adding the largest violators to the working set introduces significant instabilities in the convergence algorithm—the new point added to the chunk can lead to dramatic differences between models across chunks. Such oscillations decrease the active learning efficiency.

An alternative method is to pre-select a pool of candidates that are likely to become support vectors. SVM's regression optimization chooses as support vectors points that have poor fit with the function approximation. Points belonging to areas with poor coverage (point density) in the input space are likely to become support vectors. The pre-selected pool is used to train a model. The size of the pool acts as an upper bound on the number of support vectors. Ideally, estimating the density in the primal space and balancing the sample with respect to this density (low density areas have higher sampling rates than high density areas) would produce the desired result. Unfortunately, with increasing number of dimensions, such a strategy becomes prohibitively expensive.

Instead, the sampling method of one embodiment of the present invention attempts to identify examples that would have large residuals by performing stratified sampling with respect to target values. If an SVM model were trained on the entire data, the under-represented target ranges are likely to have a higher proportion of support vectors. Using a stratified sample with respect to the target values has another advantage—if it is assumed that the target distribution is non-uniform along its range, a random sample is likely to strongly bias a model towards target values from areas of high density. Ensuring reasonable target representation along the entire target range is likely to produce a more useful function approximation.

Figure 8:
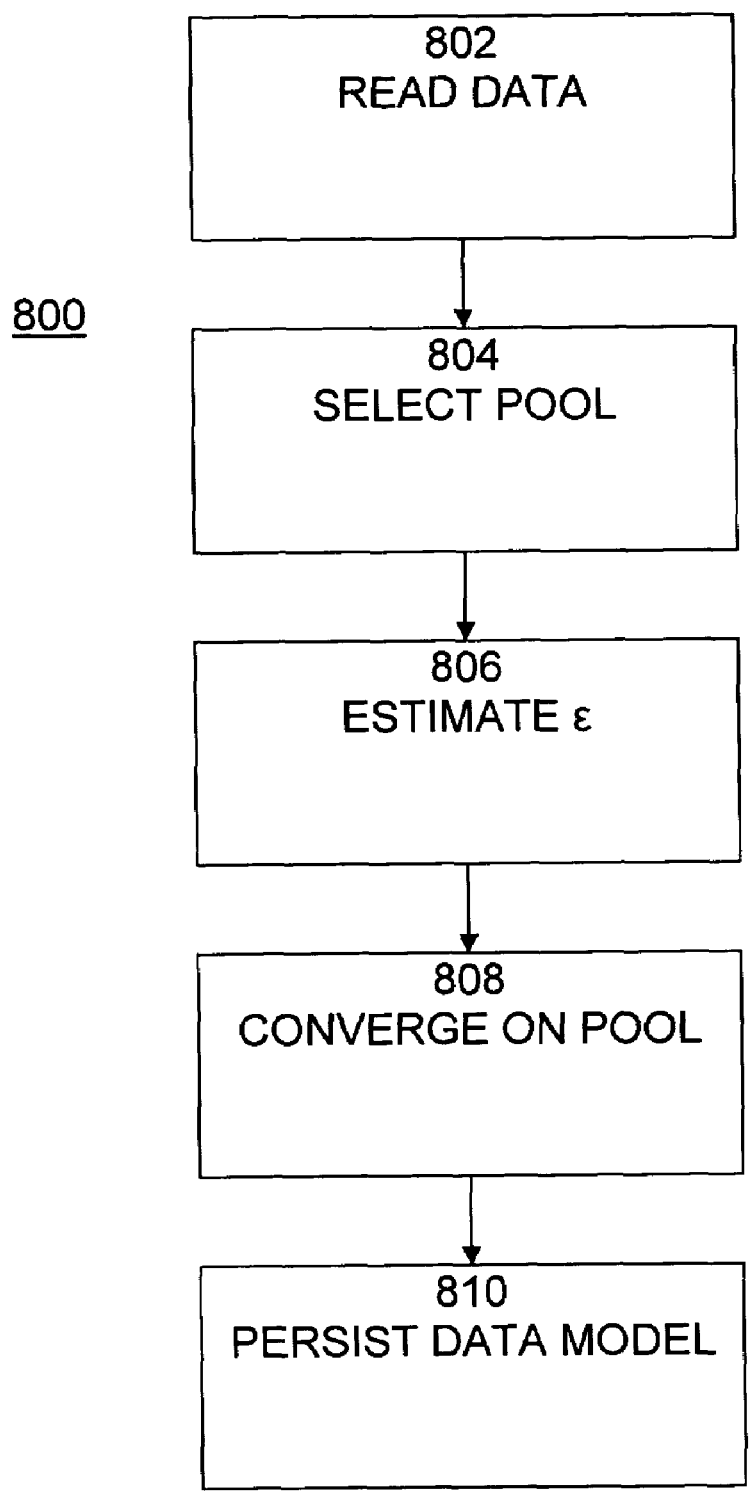
FIG. 8 is an exemplary flow diagram of a process for regression with active learning.

FIG. 8 illustrates the processing flow 800 for regression with active learning. A major modification from the previous processes is the absence of the loop where the algorithm converges on successive chunks. Instead, after the pool is selected, the algorithm converges on the pool in a single step. To increase efficiency, a chunking mechanisms on the pool may be preferable. Another modification is the introduction of $\epsilon$ parameter selection via cross-validation. The $\epsilon$ parameter value is important for controlling the smoothness of the solution and the size of the model.

Process 800 begins with step 802, in which the training data is read into memory. If the data set is large, only a fraction of the data will be retained. The data that is retained will be treated as the 'entire' dataset from algorithm's point of view due to the expense of multiple reads of the data from disk. In step 804, the process identifies a data pool of limited size that is used as a source of examples for the active learning. The pool represents a subset of the reservoir of all data. In step 806, the $\epsilon$ parameter is estimated, as described below. In step 808, SVM optimization is performed on the selected data pool or chunk thereof. Once the SVM algorithm converges on the selected data pool or chunk, then in step 810, the model is persisted and the algorithm exits. Model persistence consists of storing the model data into IOTs and creating model metadata. The model data is preferably persisted as IOTs in order to ensure fast model load during scoring.

Figure 9:
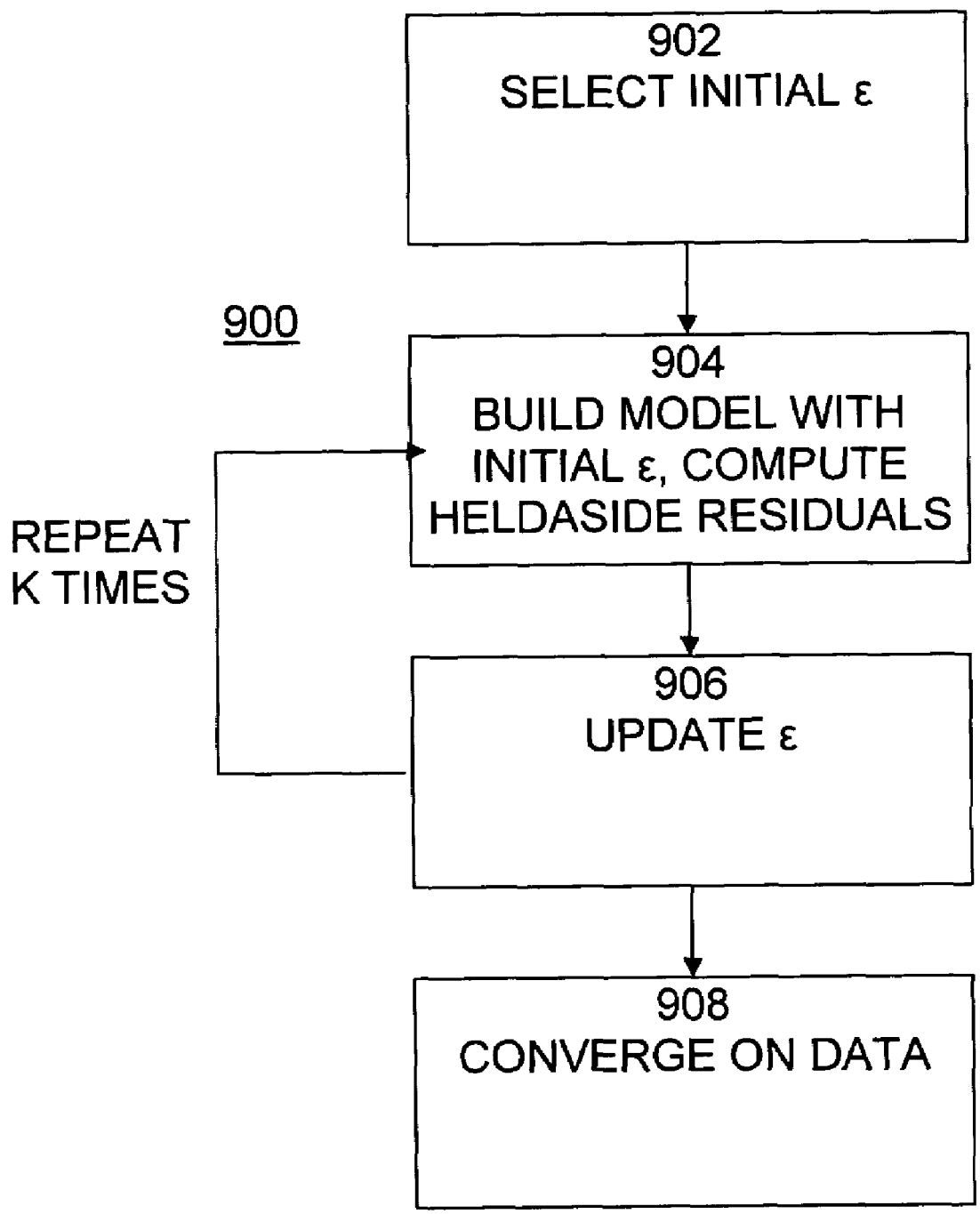
FIG. 9 is an exemplary flow diagram of a process for selecting a value of the $\epsilon$ parameter.

An example of a process 900 for selecting a value of the $\epsilon$ parameter is shown in FIG. 9. Finding an adequate value for the $\epsilon$ parameter is important for SVM regression model quality. The $\epsilon$ parameter reflects the noise level in the data and it controls the size of the model and the smoothness of the approximation. Preferably, $\epsilon$ is adapted in the course of algorithm convergence. Process 900 begins with step 902, in which an initial value of the $\epsilon$ parameter is selected. Preferably, the initial chunk uses a small $\epsilon$ equal to, for example, 1% of the mean absolute value of the target. This relates the initial $\epsilon$ value to the scale of the target. In step 904, a model is built with the initial estimate and the residuals on a held-aside sample of the data are computed. In step 906, the next chunk uses an updated $\epsilon$ value that is given by:

$$\epsilon^{new} = (\epsilon^{old} + \mu_{resid})/2, \text{ where } \mu_{resid} = \sqrt{\sum_{k}^{N} resid_k^2 / N} \bigg/ (2 * dim).$$

The new value of $\epsilon$ is the average of the previous value and the square root of the average squared residuals. The latter quantity is scale with respect to the effective dimensionality of the problem.

The $\epsilon$ parameter is adapted over several successive iterations. In step 908, the algorithm runs on the entire pool (including the held-aside sample) with fixed $\epsilon$ until convergence. The described approach produces reasonable $\epsilon$ estimates over a large range of problems.

Figure 10:
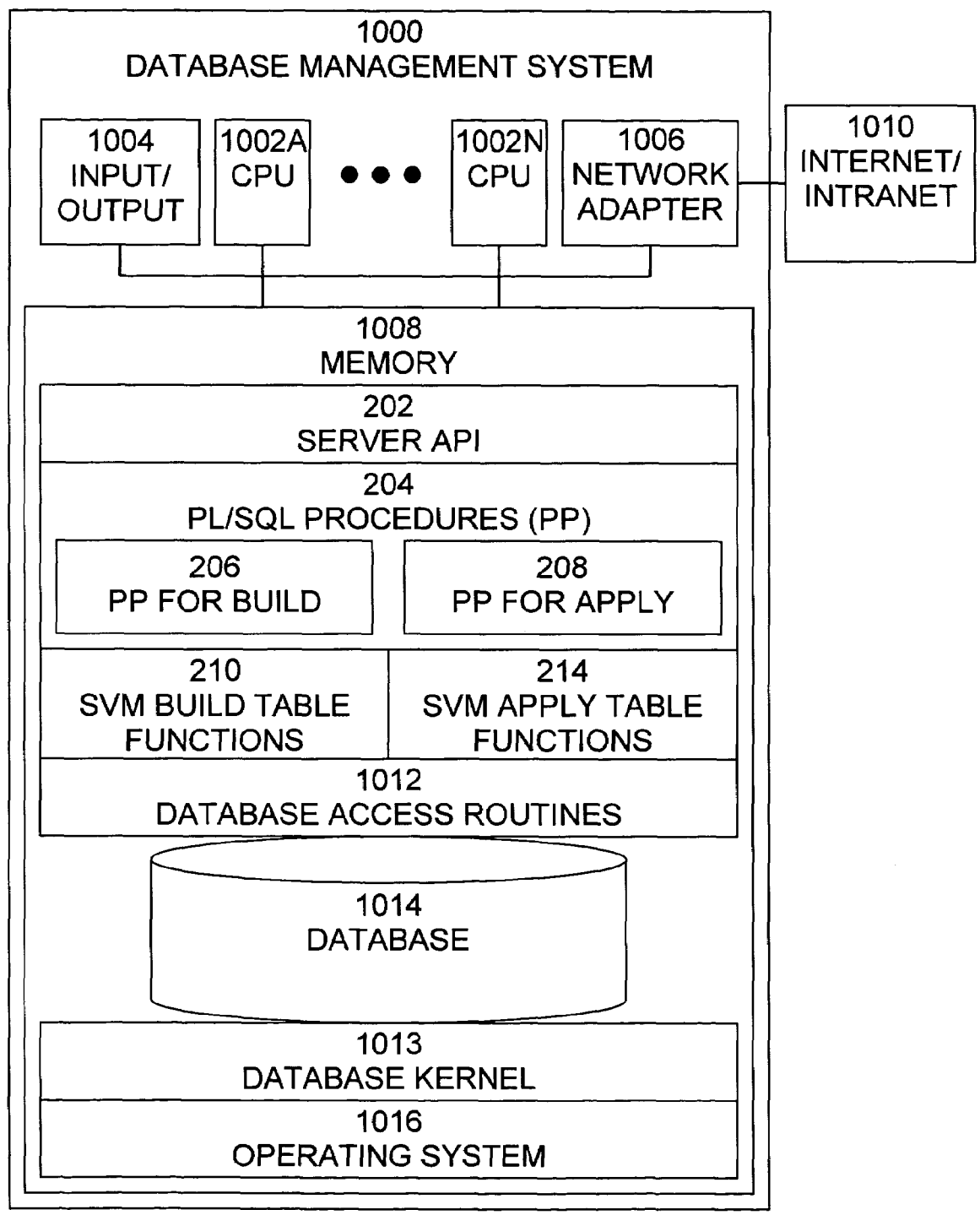
FIG. 10 is an exemplary block diagram of a database management system in which the present invention may be implemented.

An exemplary block diagram of a database management DBMS 1000 is shown in FIG. 10. DBMS 1000 is typically a programmed general-purpose computer system, such as a personal computer, workstation, server system, and minicomputer or mainframe computer. DBMS 1000 includes one or more processors (CPUs) 1002A-1002N, input/output circuitry 1004, network adapter 1006, and memory 1008. CPUs 1002A-1002N execute program instructions in order to carry out the functions of the present invention. Typically, CPUs 1002A-1002N are one or more microprocessors, such as an INTEL PENTIUM® processor. FIG. 10 illustrates an embodiment in which DBMS 1000 is implemented as a single multi-processor computer system, in which multiple processors 1002A-1002N share system resources, such as memory 1008, input/output circuitry 1004, and network adapter 1006. However, the present invention also contemplates embodiments in which DBMS 1000 is implemented as a plurality of networked computer systems, which may be single-processor computer systems, multi-processor computer systems, or a mix thereof.

Input/output circuitry 1004 provides the capability to input data to, or output data from, database/DBMS 1000. For example, input/output circuitry may include input devices, such as keyboards, mice, touchpads, trackballs, scanners, etc., output devices, such as video adapters, monitors, printers, etc., and input/output devices, such as, modems, etc. Network adapter 1006 interfaces database/DBMS 1000 with Internet/intranet 1010. Internet/intranet 1010 may include one or more standard local area network (LAN) or wide area network (WAN), such as Ethernet, Token Ring, the Internet, or a private or proprietary LAN/WAN.

Memory 1008 stores program instructions that are executed by, and data that are used and processed by, CPU 1002 to perform the functions of DBMS 1000. Memory 1008 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 1008 varies depending upon the functions that DBMS 1000 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 10, memory 1008 includes server API 202, PL/SQL procedures 204, PLS/SQL for build 206, PL/SQL procedures for apply 208, SVM build table functions 210, SVM apply table functions 214, database access routines 1012, database 1014, database kernel 1015, and operating system 1016. Client API 302 provides a programming interface to client software and may also perform processing in the client side. PL/SQL procedures 204 includes two main functions—PL/SQL procedures for build 206 and PL/SQL procedures for apply 208. PL/SQL procedures for build 206 acts as a wrapper to the Table Function routines 210 for SVM model build and basically performs preprocessing of input data. The PL/SQL procedures for apply acts as a wrapper to the SVM Apply Table Functions 214. Database access routines 1012 provide the capability to access one or more databases, such as those included in database 1014, in order to retrieve information for display. Database 1014 provides the capability to store, organize, modify, and extract information from one or more data tables included in database 1014. Database kernel 1015 provides overall DBMS functionality. Operating system 1016 provides overall system functionality.

From a technical standpoint, databases can differ widely. The terms relational, network, flat, and hierarchical all refer to the way a database organizes information internally. The internal organization can affect how quickly and flexibly you can extract information.

Each database includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

As shown in FIG. 10, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2@, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by selecting a complexity parameter C method for a linear kernel method by:
   selecting a random sample comprising k pairs of training vectors of opposite class, one member of each pair being of positive class and one member of each pair being of negative class;
   for each pair, assigning C to have a value such that a margin for the positive class member of the pair is 1 and a margin for the negative class member of the pair is -1;
   ordering the assigned values of C; and
   selecting as C a k-th highest assigned value of C.

2. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by selecting a complexity parameter C method for a Gaussian kernel method by:
   selecting a random group comprising k examples of positive class and k examples of negative class;
   predicting a class for each member of the random group, wherein the examples are support vectors with a constant value of alpha;
   removing examples that predict a wrong class;
   for each remaining example, estimating C as a value required to separate the example from all other group members with a margin of 1;
   ordering the estimated values of C; and selecting as C a k-th highest estimated value of C.

3. A cmoputerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by:
   selecting the complexity parameter C method for a regression method by selecting a value of C that is a multiple of a target class standard deviation.

4. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output,
   wherein the parameter estimation is performed by:
   selecting the complexity parameter C method for a one-class support vector machine method;
   wherein the complexity parameter C method is selected for a one-class support vector machine method by:
   selecting an initial value of C;
   increasing the value of C, while an outlier rate with the initial value of C is above a user-specified value;
   setting C to an average of a current value of C and a previous value of C, once the value of C is above the user-specified value, until a target outlier rate is substantially achieved or a maximum number of iterations is reached.

5. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by selecting a standard deviation σ for a Gaussian kernel method for a classification method by:
   selecting k pairs of training vectors of opposite class, one member of each pair being of positive class and one member of each pair being of negative class;
   for each pair, computing an estimate of σ based on a distance between members of the pair; and
   selecting as σ a k-th highest estimated σ.

6. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by selecting a standard deviation σ for a Gaussian kernel method for a regression method by:
   selecting pairs of random points from the data;
   for each pair, determining distances between members of the pair;
   ranking the determined distances; and
   selecting as σ a k-th highest distance percentile of the ranked distances.

7. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by selecting a standard deviation σ
   for a Gaussian kernel method for a one-class support vector machine method by:
   selecting pairs of random points from the data, both members of each pair being of the one class;
   for each pair, determining distances between members of the pair;
   ranking the determined distances; and selecting as σ a k-th highest distance percentile of the ranked distances.

8. A computerized method for support vector machine processing comprising:
   storing data;
   providing an interface to client software;
   building a support vector machine model on at least a portion of the stored data, based on a plurality of model-building parameters;
   estimating values for at least some of the model-building parameters; and applying the support vector machine model using the stored data to generate a data mining output;
   wherein the parameter estimation is performed by selecting an c parameter for a regression method by:
   selecting a random initial value of C;
   selecting a random sample of data;
   converging on the random sample of data;
   estimating prediction noise using a held-aside data set;
   repeatedly adjusting c to be a function of the residuals computed on held-aside data;
   selecting as c an adjusted value of c that produces a lowest residual on the held-aside data set.

9. A computerized method for support vector machine processing comprising:
   storing data;
   providing an interface to client software;
   building a support vector machine model on at least a portion of the stored data, the portion of the data selected using partial random chunk selection;
   applying the support vector machine model using the stored data to generate a data mining output;
   wherein the partial random chunk selection is performed by:
   i) selecting an initial chunk of data from the data stored in the database management method;
   ii) performing optimization on the selected chunk until the optimization converges on the selected chunk according to convergence conditions;
   iii) checking the convergence conditions against the data stored in the database management method to obtain violators of the convergence conditions,
   iv) updating the chunk to form a new selected chunk comprising members of the previous selected chunk and at least some of violators of the convergence conditions, selected randomly with a bias towards large violators; and
   v) repeating ii - iv until the convergence conditions are met on at least a portion of the data stored in the database management method.

10. The method of claim 9 wherein the support vector machine model is built using a classification support vector machine algorithm, a regression support vector machine algorithm, or a one-class support vector machine algorithm.

11. The method of claim 9, wherein the building is performed by:
    building a support vector machine model on at least a portion of the data stored in the method using data sampling, and the apply unit is further operable to apply the support vector machine model using the data stored in the method using models based on data sampling.

12. The method of claim 11, wherein the build unit uses an active sampling method.

13. The method of claim 11, wherein the support vector machine model is built using a classification support vector machine algorithm, a regression support vector machine algorithm, or a one-class support vector machine algorithm.

14. The method of claim 9, wherein the building is performed by:
    building a support vector machine model on at least a portion of the data stored in the method using a data summarization driven method, and the apply unit is further operable to apply the support vector machine model using the data stored in the method using models based on data summarization driven method.

15. The method of claim 9, wherein the building is performed by:
    building a support vector machine model on at least a portion of the data stored in the method using stratified random sampling, and the apply unit is further operable to apply the support vector machine model using the data stored in the method using stratified random sampling.

16. The method of claim 9, further comprising:
    incrementally updating the model.

17. The method of claim 16, wherein the incremental updating is performed by:
    incorporating additional data into an existing model without rebuilding the entire model.

18. The method of claim 16, wherein the incremental updating is performed by:
    adapting an existing model to a stream of data wherein an underlying distribution changes over time.

* * * * *

UNITED STATES PATENT AND TRADEMARK OFFICE
CERTIFICATE OF CORRECTION

PATENT NO. : 7,490,071 B2
APPLICATION NO. : 10/927111
DATED : February 10, 2009
INVENTOR(S) : Milenova et al.

It is certified that error appears in the above-identified patent and that said Letters Patent is hereby corrected as shown below:

In column 1, line 15, after "system" insert -- . --.

In column 3, line 17, delete "deviation a" and insert -- deviation $\sigma$ --, therefor.

In column 10, line 64, delete "ai" and insert -- $\alpha_i$ --, therefor.

In column 13, line 18, delete "E" and insert -- $\varepsilon$ --, therefor.

In column 13, line 39, delete "E" and insert -- $\varepsilon$ --, therefor.

In column 17, line 42, after "$y_j'||$" insert -- . --.

In column 20, line 11, after "$\xi i$" insert -- . --.

In column 22, line 43, after "incrementally" insert -- . --.

In column 28, line 66, after "data" insert -- . --.

In column 34, line 62, delete "2@," and insert -- 2®, --, therefor.

In column 36, line 10, in claim 3, delete "cmoputerized" and insert -- computerized --, therefor.

In column 36, line 34, in claim 4, delete "output," and insert -- output; --, therefor.

In column 37, line 42, in claim 8, delete "compnsing:" and insert -- comprising: --, therefor.

In column 37, line 52, in claim 8, delete "c" and insert -- $\varepsilon$ --, therefor.

In column 37, line 53, in claim 8, delete "C;" and insert -- $\varepsilon$; --, therefor.

In column 37, line 57, in claim 8, delete "c" and insert -- $\varepsilon$ --, therefor.

In column 37, line 59, in claim 8, delete "as c" and insert -- as $\varepsilon$ --, therefor.

In column 37, line 59, in claim 8, delete "of c" and insert -- of $\varepsilon$ --, therefor.

In column 38, line 14, in claim 9, delete "conditions," and insert -- conditions; --, therefor.

In column 38, line 23, in claim 10, delete "claim 9" and insert -- claim 9, --, therefor.

Signed and Sealed this

Eleventh Day of May, 2010

David J. Kappos
*Director of the United States Patent and Trademark Office*